United States Patent
Attar et al.

(10) Patent No.: US 7,177,648 B2
(45) Date of Patent: *Feb. 13, 2007

(54) METHOD AND APPARATUS FOR SELECTING A SERVING SECTOR IN A DATA COMMUNICATION SYSTEM

(75) Inventors: Rashid A. Attar, San Diego, CA (US); Rajiv Vijayan, San Diego, CA (US); Roberto Padovani, San Diego, CA (US); Nagabhushana T. Sindhushayana, San Diego, CA (US); Qiang Wu, San Diego, CA (US); Peter J. Black, San Diego, CA (US); Eduardo A. S. Esteves, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 10/728,635

(22) Filed: Dec. 5, 2003

(65) Prior Publication Data

US 2004/0087276 A1    May 6, 2004

Related U.S. Application Data

(63) Continuation of application No. 09/892,378, filed on Jun. 26, 2001, now Pat. No. 6,757,520.

(51) Int. Cl.
*H04Q 7/20* (2006.01)
(52) U.S. Cl. .............................. 455/452.2; 455/422.1; 455/450; 370/328

(58) Field of Classification Search ............... 455/63.1, 455/63.2, 422.1, 450, 437, 62, 446, 562, 455/452.2, 436; 370/332, 331, 333, 328
See application file for complete search history.

(56) References Cited

U.S. PATENT DOCUMENTS

| | | | |
|---|---|---|---|
| 4,901,307 | A | 2/1990 | Gilhousen et al. |
| 5,103,459 | A | 4/1992 | Gilhousen et al. |
| 5,267,261 | A | 11/1993 | Blakeney, II et al. |
| 5,428,818 | A | 6/1995 | Meidan et al. |
| 5,504,733 | A | 4/1996 | Padovani et al. |
| 5,886,988 | A | 3/1999 | Yun et al. |
| 5,933,462 | A | 8/1999 | Viterbi et al. |
| 5,933,787 | A | 8/1999 | Gilhousen et al. |
| 5,999,522 | A * | 12/1999 | Rohani ...................... 370/331 |
| 6,085,108 | A | 7/2000 | Knutsson et al. |
| 6,205,129 | B1 | 3/2001 | Esteves et al. |
| 6,229,795 | B1 | 5/2001 | Pankaj et al. |

(Continued)

*Primary Examiner*—Charles Appiah
*Assistant Examiner*—Nghi H. Ly
(74) *Attorney, Agent, or Firm*—Thomas R. Rouse; Thien T. Nguyen; Lee Hsu

(57) ABSTRACT

Methods and apparatus for selecting a serving sector in a high rate data (HDR) communication system are disclosed. An exemplary HDR communication system defines a set of data rates, at which a sector of an Access Point may send data packets to an Access Terminal. The sector is selected by the Access Terminal to achieve the highest data throughput while maintaining a targeted packet error rate. The Access Terminal employs various methods to evaluate quality metrics of forward and reverse links from and to different sectors, and uses the quality metrics to select the sector to send data packets to the Access Terminal.

4 Claims, 17 Drawing Sheets

U.S. PATENT DOCUMENTS

| | | |
|---|---|---|
| 6,504,828 B1 | 1/2003 | Corbett |
| 6,741,582 B1 * | 5/2004 | Mansour ..................... 370/342 |
| 6,745,051 B1 * | 6/2004 | Bassirat ................... 455/562.1 |
| 6,757,520 B2 * | 6/2004 | Attar et al. ................. 455/63.1 |
| 6,785,559 B1 * | 8/2004 | Goldberg et al. ........ 455/562.1 |

* cited by examiner

METHOD AND APPARATUS FOR SELECTING A SERVING SECTOR IN A DATA COMMUNICATION SYSTEM

The present Application for Patent is a Continuation and claims priority to U.S. patent application Ser. No. 09/892,378 entitled "METHOD AND APPARATUS FOR SELECTING A SERVING SECTOR IN A DATA COMMUNICATION SYSTEM," filed Jun. 26, 2001, now U.S. Pat. No. 6,757,520, issued Jun. 29, 2004, and assigned to the assignee hereof and hereby expressly incorporated by reference herein.

BACKGROUND

1. Field

The present invention relates generally to communication systems, and more specifically, to a method and an apparatus for selecting a serving sector in a data communication system.

2. Background

Communication systems have been developed to allow transmission of information signals from an origination station to a physically distinct destination station. In transmitting information signals from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.2 12, 3G TS 25.213, and 3G TS 25.214 (the W-CDMA standard), or "TR-45.5 Physical Layer Standard for cdma2000 Spread Spectrum Systems"(the IS-2000 standard).

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

An example of a data only communication system is a high data rate (HDR) communication system that conforms to the TIA/EIA/IS-856 industry standard, hereinafter referred to as the IS-856 standard. This HDR system is based on a communication system disclosed in co-pending application Ser. No. 08/963,386, entitled "METHOD and apparatus FOR HIGH RATE PACKET DATA transmission," filed Nov. 3, 1997, assigned to the assignee of the present invention. The HDR communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

A significant difference between voice services and data services is the fact that the former imposes stringent and fixed delay requirements. Typically, the overall one-way delay of speech frames must be less than 100 ms. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. patent application Ser. No. 08/743,688, entitled "SOFT DECISION OUTPUT DECODER FOR DECODING CONVOLUTIONALLY ENCODED CODEWORDS," filed Nov. 6, 1996, now U.S. Pat. No. 5,933,462, issued Aug. 3, 1999, assigned to the assignee of the present invention.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a predetermined amount of data, hereinafter referred to as a data packet.

Yet another significant difference between voice services and data services is that the former requires a reliable communication link. When a mobile station, communicating with a first base station, moves to the edge of the associated cell or sector, the mobile station initiates a simultaneous communication with a second base station. This simultaneous communication, when the mobile station receives a signal carrying equivalent information from two base stations, termed soft handoff, is a process of establishing a communication link with the second base station while maintaining a communication link with the first base station. When the mobile station eventually leaves the cell or sector associated with the first base station and breaks the communication link with the first base station, it continues the communication on the communication link established with the second base station. Because the soft handoff is a "make before break" mechanism, the soft handoff minimizes the probability of dropped calls. The method and system for providing a communication with a mobile station through more than one base station during the soft handoff process are disclosed in U.S. Pat. No. 5,267,261, entitled "MOBILE STATION ASSISTED SOFT HANDOFF IN A CDMA CELLULAR COMMUNICATIONS SYSTEM," assigned to the assignee of the present invention. Softer handoff is the process whereby the communication occurs over multiple sectors that are serviced by the same base station. The process of softer handoff is described in detail in U.S. patent application Ser. No. 08/763,498, entitled "METHOD AND APPARATUS FOR PERFORMING HANDOFF BETWEEN SECTORS OF A COMMON BASE STATION," filed Dec. 11, 1996, now U.S. Pat. No. 5,933,787, issued Aug. 3, 1999, assigned to the assignee of the present invention. Thus, both soft and softer handoff for voice services result in redundant transmissions from two or more base stations to improve reliability.

This additional reliability is not required for data transmission because the data packets received in error can be retransmitted. For data services, the parameters, which measure the quality and effectiveness of a data communication system, are the transmission delay required to transfer a data packet and the average throughput rate of the system. Transmission delay does not have the same impact in data communication as in voice communication, but the transmission delay is an important metric for measuring the quality of the data communication system. The average throughput rate is a measure of the efficiency of the data transmission capability of the communication system. Consequently, the transmit power and resources used to support soft handoff can be more efficiently used for transmission of additional data. To maximize the throughput, the transmitting sector should be chosen in a way that maximizes the forward link throughput as perceived by the Access Terminal (AT).

There is, therefore, a need in the art for a method and an apparatus for selecting a sector in a data communication system that maximizes the forward link throughput as perceived by the AT.

SUMMARY

In one aspect of the invention, the above-stated needs are addressed by determining at the remote station a quality metric of a forward link for each sector in the remote station's list, determining a quality metric of a reverse link to each sector in the remote station's list, and directing communication between the remote station and one sector from the sectors in the remote station's list in accordance with said determined quality metric of a forward link and said determined quality metric of a reverse link. The quality metric of a forward link for each sector in the remote station's list may be determined by measuring a signal-to-interference and signal-to-noise ratio of the forward link. The quality metric of a reverse link to each sector in the remote station's list may be determined by processing at the remote station the forward link from each sector in the remote station's list. The signal processed may be obtained by measuring at each sector the quality metric of the reverse link, processing the quality metric to provide an indicator of the quality metric, and providing the indicator on a forward link. The communication between the remote station and one sector from the sectors in the remote station's list may be directed in accordance with said determined quality metric of a forward link and said determined quality metric of a reverse link by assigning credits to each sector in the remote station's list, except a sector currently serving the remote station in accordance with said determined quality metric of a forward link and said determined quality metric of the reverse link, and directing communication between the remote station and one sector from the sectors in the remote station's list in accordance with said assigned credits.

In another aspect of the invention, the above-stated needs are addressed by determining at the remote station a quality metric of a forward link for each sector in the remote station's list; and directing communication between the remote station and one sector from the sectors in the remote station's list in accordance with said determined quality metric of a forward link. The quality metric of a forward link for each sector in the remote station's list may be determined by measuring a signal-to-interference and signal-to-noise ratio of the forward link. The communication between the remote station and one sector from the sectors in the remote station's list may be directed in accordance with said determined quality metric of a forward link by assigning credits to each sector in the remote station's list, except a sector currently serving the remote station in accordance with said determined quality metric of a forward link and directing communication between the remote station and one sector from the sectors in the remote station's list in accordance with said assigned credits.

DETAILED DESCRIPTION

Figure 1:
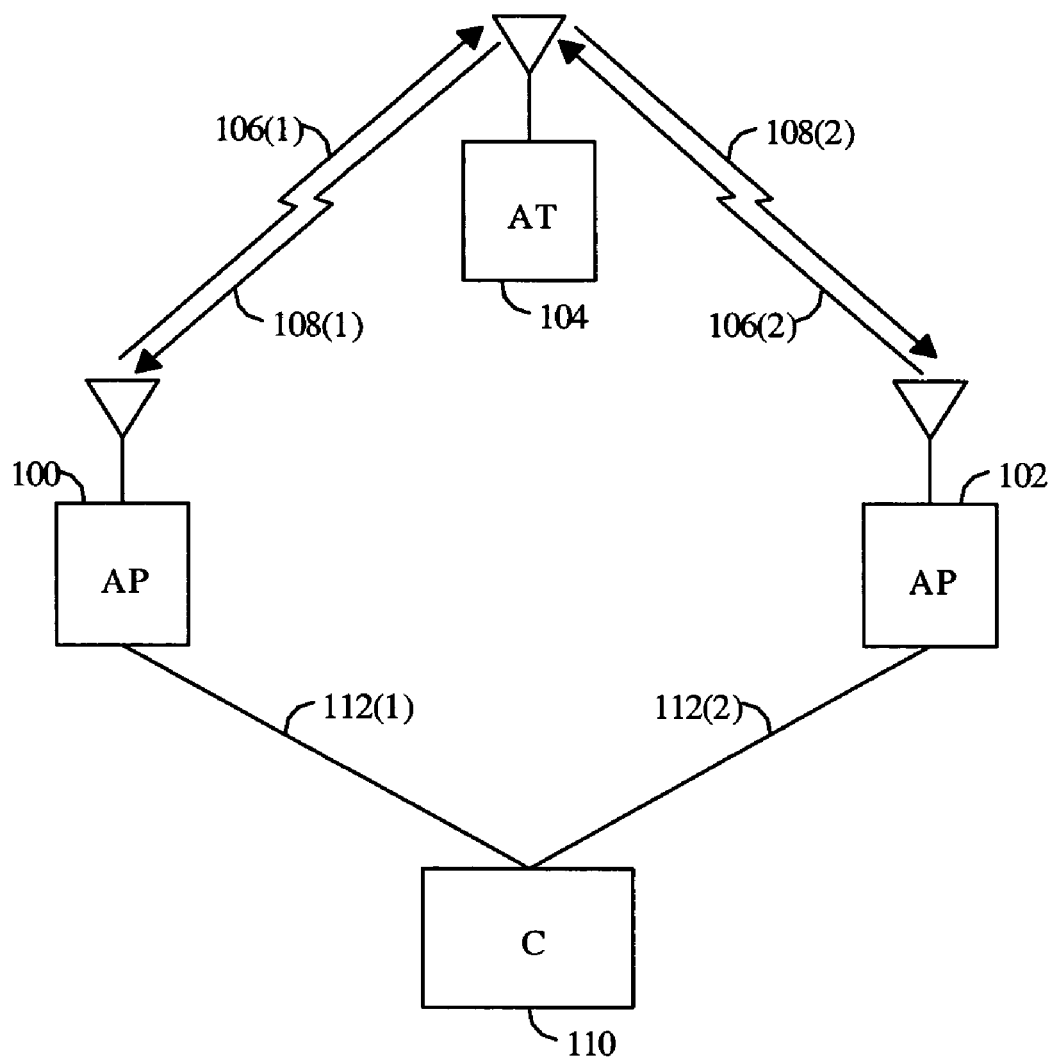
FIG. 1 illustrates a conceptual diagram of a High Data Rate (HDR) communication system.

The word "exemplary" is used exclusively herein to mean "serving as an example, instance, or illustration." Any embodiment described herein as "exemplary" is not necessarily to be construed as preferred or advantageous over other embodiments.

The term packet is used exclusively herein to mean a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network is used exclusively herein to mean a collection of access points (APs) and one or more access point controllers. The access network transports data packets between multiple access terminals (ATs). The access network may be further connected to additional networks outside the access network, such as a corporate intranet or the Internet, and may transport data packets between each access terminal and such outside networks.

The term base station, referred to herein as an AP in the case of an HDR communication system, is used exclusively herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station, referred to herein as an AT in the case of an HDR communication system, is used exclusively herein to mean the hardware with which an access network communicates. An AT may be mobile or stationary. An AT may be any data device that communicates through a wireless channel or through a wired channel, for example using fiber optic or coaxial cables. An AT may further be any of a number of types of devices including, but not limited to a PCT Card, a compact flash, an external or internal modem, or a wireless or wireline phone. An AT that is in the process of establishing an active traffic channel connection with an AP is said to be in a connection setup state. An AT that has established an active traffic channel connection with an AP is called an active AT and is said to be in a traffic state.

The term communication channel/link is used exclusively herein to mean a single route over which a signal is transmitted described in terms of modulation characteristics and coding, or a single route within the protocol layers of either the AP or the AT.

The term reverse channel/link is used exclusively herein to mean a communication channel/link through which the AT sends signals to the AP.

A forward channel/link is used exclusively herein to mean a communication channel/link through which an AP sends signals to an AT.

The term softer handoff is used exclusively herein to mean a communication between a subscriber station and two or more sectors, wherein each sector belongs to the same cell. In the context of the IS-95 standard, the reverse link communication is received by both sectors, and the forward link communication is simultaneously carried on one of the two or more sectors' forward links. In the context of the IS-856 standard, data transmission on the forward link is non-simultaneously carried out between one of the two or more sectors and the AT.

The term softer handoff is used exclusively herein to mean a communication between a subscriber station and two or more sectors, wherein each sector belongs to the same cell. In the context of the IS-95 standard, the reverse link communication is received by both sectors, and the forward link communication is simultaneously carried on one of the two or more sectors' forward links. In the context of the IS-856 standard, data transmission on the forward link is non-simultaneously carried out between one of the two or more sectors and the AT.

The term re-pointing is used exclusively herein to mean a selection of a sector that is a member of an AT's active list, wherein the sector is different than a currently selected sector.

The term soft/softer handoff delay is used exclusively herein to indicate the minimum interruption in service that a subscriber station would experience following a handoff to another sector. Soft/softer handoff delay is determined based on whether the sector, (currently not serving the subscriber station, or the non-serving sector) to which the subscriber station is re-pointing is part of the same cell as the current serving sector. If the non-serving sector is in the same cell as the serving sector, then the softer handoff delay is used, and if the non-serving sector is in a cell different from the one that the serving sector is part of, then the soft handoff delay is used.

The term non-homogenous soft/softer handoff delay is used exclusively herein to indicate that the soft/softer handoff delays are sector specific, and therefore may not uniform across the sectors of an Access Network.

The term credit is used exclusively herein to mean a dimensionless attribute indicating a quality metric of a reverse link, a quality metric of a forward link, or a composite quality metric of both forward and reverse links.

The term erasure is used exclusively herein to mean failure to recognize a message.

The term outage is used exclusively herein to mean a time interval during which the likelihood that a subscriber station will receive service is reduced.

The term fixed rate mode is used exclusively herein to mean that a particular sector transmits a Forward Traffic Channel to the AT at one particular rate.

Description

FIG. 1 illustrates a conceptual diagram of an HDR communication system capable of performing re-pointing in accordance with embodiments of the present invention, e.g., a communication system in accordance with the IS-856 standard. An AP 100 transmits data to an AT 104 over a forward link 106(1) and receives data from the AT 104 over a reverse link 108(1). Similarly, an AP 102 transmits data to the AT 104 over a forward link 106(2) and receives data from the AT 104 over a reverse link 108(2). In accordance with one embodiment, data transmission on the forward link occurs from one AP to one AT at or near the maximum data rate that can be supported by the forward link and the communication system. Other channels of the forward link, e.g., control channel, may be transmitted from multiple APs to one AT. Reverse link data communication may occur from one AT to one or more APs. The AP 100 and the AP 102 are connected to a controller 110 over backhauls 112(1) and 112(2). The term backhaul is used to mean a communication link between a controller and an AP. Although only two ATs and one AP are shown in FIG. 1, one of ordinary skill in the art recognizes that this is for pedagogical purposes only, and the communication system can comprise a plurality of ATs and APs.

Initially, the AT 104 and one of the APs, e.g., the AP 100, establish a communication link using a predetermined access procedure. In this connected state, the AT 104 is able to receive data and control messages from the AP 100 and is able to transmit data and control messages to the AP 100. The AT 104 continually searches for other APs that could be added to the AT 104 active set. The active set comprises a list of the APs capable of communication with the AT 104. When such an AP is found, the AT 104 calculates a quality metric of the AP's forward link, which in one embodiment comprises a signal-to-interference-and-noise ratio (SINR). In one embodiment, the AT 104 searches for other APs and determines the AP's SINR in accordance with a pilot signal. Simultaneously, the AT 104 calculates the forward link quality metric for each AP in the AT 104 active set. If the forward link quality metric from a particular AP is above a predetermined add threshold or below a predetermined drop threshold for a predetermined period of time, the AT 104 reports this information to the AP 100. Subsequent messages from the AP 100 direct the AT 104 to add to or to delete from the AT 104 active set the particular AP.

The AT 104 selects a serving AP from the active set based on a set of parameters. The term serving AP refers to an AP that a particular AT selected for data communication or an AP that is communicating data to the particular AT. The set of parameters can comprise present and previous SINR measurements, a bit-error-rate and/or a packet-error-rate, and other parameters known to one skilled in the art. In one embodiment, the serving AP is selected in accordance with the largest SINR measurement. The AT 104 then transmits to the selected AP a data request message (DRC message) on the data request channel (DRC channel). The DRC message can contain the requested data rate or, alternatively, an indication of the quality of the forward link, e.g., the measured SINR, the bit-error-rate, or the packet-error-rate. In one embodiment, the AT 104 can direct the transmission of the DRC message to a specific AP by the use of a Walsh code, which uniquely identifies the specific AP. The DRC message symbols are exclusively OR'ed (XOR) with the unique Walsh code. The XOR operation is referred to as Walsh-covering of a signal. Since each AP in the active set of the AT 104 is identified by a unique Walsh code, only the selected AP which performs the identical XOR operation as that performed by the AT 104 with the correct Walsh code can correctly decode the DRC message.

The data to be transmitted to the AT 104 arrive at the controller 110. In accordance with one embodiment, the controller 110 sends the data to all APs in AT 104 active set over the backhaul 112. In another embodiment, the controller 110 first determines which AP was selected by the AT 104 as the serving AP, and then sends the data to the serving AP. The data are stored in a queue at the AP(s). A paging message is then sent by one or more APs to the AT 104 on respective control channels. The AT 104 demodulates and decodes the signals on one or more control channels to obtain the paging messages.

At each time time-slot, the AP can schedule data transmission to any of the ATs that received the paging message. An exemplary method for scheduling transmission is described in U.S. Pat. No. 6,229,795, entitled "System for allocating resources in a communication system," assigned to the assignee of the present invention. The AP uses the rate control information received from each AT in the DRC message to efficiently transmit forward link data at the highest possible rate. In one embodiment, the AP determines the data rate at which to transmit the data to the AT 104 based on the most recent value of the DRC message received from the AT 104. Additionally, the AP uniquely identifies a transmission to the AT 104 by using a spreading code which is unique to that mobile station. In the exemplary embodiment, this spreading code is the long pseudo noise (PN) code, which is defined by the IS-856 standard.

The AT 104, for which the data packet is intended, receives the data transmission and decodes the data packet. In one embodiment, each data packet is associated with an identifier, e.g., a sequence number, which is used by the AT 104 to detect either missed or duplicate transmissions. In such an event, the AT 104 communicates via the reverse link data channel the sequence numbers of the missing data units. The controller 110, which receives the data messages from the AT 104 via the AP communicating with the AT 104, then indicates to the AP what data units were not received by the AT 104. The AP then schedules a retransmission of such data units.

When the communication link between the AT 104 and the AP 100, operating in the variable rate mode, deteriorates below required reliability level, the AT 104 first attempts to determine whether communication with another AP in the variable rate mode supporting an acceptable rate data is possible. If the. AT 104 ascertains such an AP (e.g., the AP 102), a re-pointing to the AP 102, therefore, to a different communication link occurs, and the data transmissions continue from the AP 102 in the variable rate mode. The above-mentioned deterioration of the communication link can be caused by, e.g., the AT 104 moving from a coverage area of the AP 100 to the coverage area of the AP 102, shadowing, fading, and other reasons known to one skilled in the art. Alternatively, when a communication link between the AT 104 and another AP (e.g., the AP 102) that may achieve higher throughput rate that the currently used communication link becomes available, a re-pointing to the AP 102, therefore, to a different communication link occurs, and the data transmissions continue from the AP 102 in the variable rate mode. If the AT 104 fails to detect an AP that can operate in the variable rate mode and support an acceptable data rate, the AT 104 transitions into a fixed rate mode.

In one embodiment, the AT 104 evaluates the communications links with all candidate APs for both variable rate data and fixed rate data modes, and selects the AP, which yields the highest throughput.

The AT 104 will switch from the fixed rate mode back to the variable rate mode if the sector is no longer a member of the AT 104 active set.

In the exemplary embodiment, the above described the fixed rate mode and associated methods for transition to and from the fixed mode are similar to those disclosed in detail in U.S. Pat. No. 6,205,129, entitled "METHOD AND APPARATUS FOR VARIABLE AND FIXED FORWARD LINK RATE CONTROL IN A MOBILE RADIO COMMUNICATION SYSTEM," assigned to the assignee of the present invention. Other fixed rate modes and associated methods for transition to and from the fixed mode can also be contemplated and are within the scope of the present invention.

One skilled in the art recognizes that an AP can comprise one or more sectors. In the description above, the term AP was used generically to allow clear explanation of basic concepts of the HDR communication system. However, one skilled in the art can extend the explained concepts to AP comprising any number of sectors. Consequently, the concept of sector will be used throughout the rest of the document.

Forward Link Structure

Figure 2:
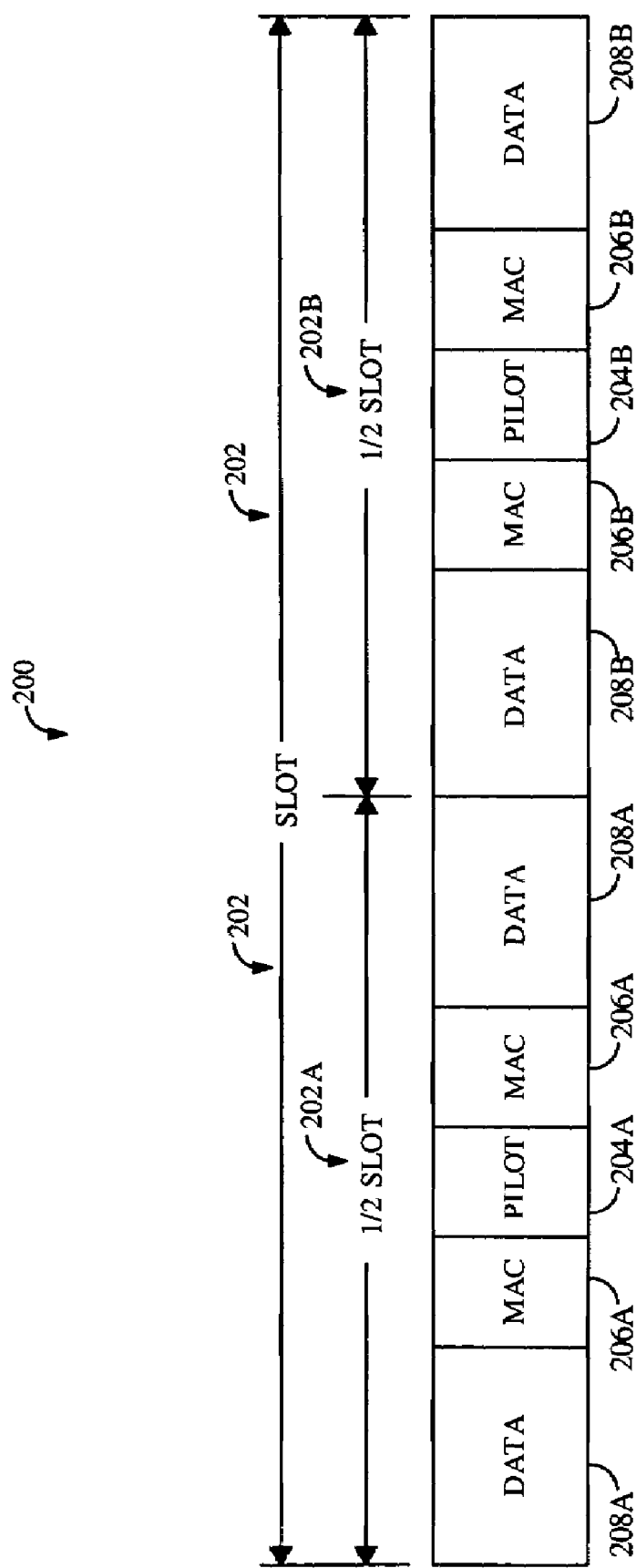
FIG. 2 illustrates an exemplary forward link waveform.

FIG. 2 illustrates an exemplary forward link waveform 200. For pedagogical reasons, the forward link waveform 200 is modeled after a forward link waveform of the above-mentioned HDR system. However, one of ordinary skill in the art will understand that the teaching is applicable to different waveforms. Thus, for example, in one embodiment the waveform does not need to contain pilot signal bursts, and the pilot signal can be transmitted on a separate channel, which can be continuous or bursty. The forward link waveform 200 is defined in terms of frames. A frame is a structure comprising 16 time-slots 202, each time-slot 202 being 2048 chips long, corresponding to a 1.66-ms time-slot duration, and, consequently, a 26.66-ms frame duration. Each time-slot 202 is divided into two half-time-slots 202A and 202B, with pilot bursts 204A and 204B transmitted within each half-time-slot 202A and 202B. In the exemplary embodiment, each pilot burst 204A and 204B is 96 chips long, and is centered at the mid-point of its associated half-time-slot 202A and 202B. The pilot bursts 204A and 204B comprise a pilot channel signal covered by a Walsh cover with index 0. A forward medium access control channel (MAC) 206 forms two bursts, which are transmitted immediately before and immediately after the pilot burst 204 of each half-time-slot 202. In the exemplary embodiment, the MAC is composed of up to 64 code channels, which are orthogonally covered by 64-ary Walsh codes. Each code channel is identified by a MAC index, which has a value between 1 and 64, and identifies a unique 64-ary Walsh cover. A reverse power control channel (RPC) is used to regulate the power of the reverse link signals for each subscriber station. The RPC is assigned to one of the available MACs with MAC index between 5 and 63. The MAC with MAC index 4 is used for a reverse activity channel (RA), which performs flow control on the reverse traffic channel. The forward link traffic channel and control channel payload is sent in the remaining portions 208A of the first half-time-slot 202A and the remaining portions 208B of the second half-time-slot 202B.

Re-Pointing Using a DRC Lock Indication—Introduction

A re-pointing decision is made by the AT 104 in accordance with a condition of a forward link, a condition of a reverse link, or a condition of both a forward link and a reverse link. As described above, the AT 104 determines a forward link quality metric directly, e.g., by measuring the forward link SINR. The quality metric of a reverse link may comprise a reverse link SINR, a DRC erasure rate, a filtered RPC mean, and other quality metrics known to one skilled in the art.

As discussed, the AT 104 identifies a serving sector of a particular AP and transmits a DRC message on a DRC channel on a reverse link. The reverse link carrying the DRC messages between the AT 104 and the serving sector is subject to various factors that change characteristics of the communication channel. In a wireless communications systems these factors comprise, but are not limited to: fading, noise, interference from other terminals, and other factors known to one skilled in the art. The DRC message is protected against the changing characteristics of the communication channel by various methods, e.g., message length selection, encoding, symbol repetition, interleaving, transmission power, and other methods known to one of ordinary skill in the art. However, these methods impose performance penalties, e.g., increased overhead, thus, decreased throughput, increased power consumption, increased peak-to-average power, increased power amplifier backoff, more expensive power amplifiers, and other penalties known to one skilled in the art. Therefore, an engineering compromise between a reliability of message delivery and an amount of overhead must be made. Consequently, even with the protection of information, the conditions of the communication channel can degrade to the point at which the serving sector possibly cannot decode (erases) some of the DRC messages. Therefore, the DRC erasure rate is directly related to the conditions of the reverse link, and the DRC erasure rate is a good quality metric of the reverse link.

However, the AT 104 can directly determine neither the reverse link SINR nor the DRC erasure rate. Both the reverse link SINR and the DRC erasure rate may be directly determined by the sectors in the AT 104 active set. The sector(s) then supplies the AT 104 with the determined values of the reverse link SINR or the DRC erasure rate via a feedback loop. In order for a sector to transmit accurate information regarding the reverse link SINR or DRC erasure rate, the sector must use some forward link capacity. In order to minimize the impact on forward link capacity, the reverse link SINR or the DRC erasure rate is sent with very low granularity. In one embodiment, the granularity is one bit. Furthermore, a consideration of a feedback loop speed versus a performance of the Reverse Link Traffic Channel performance must be made.

Therefore, in a Message Based DRC Lock embodiment, each sector in the AT 104 active set monitors the DRC channel and evaluates an erasure rate of the DRC messages. Each sector then sets a DRC Lock Bit for the AT 104 in accordance with the evaluated erasure rate. In one embodiment, the DRC Lock Bit set to one value, e.g., one ("in-lock"), indicates that the DRC erasure rate is acceptable; the DRC Lock Bit set to a second value, e.g., zero ("out-of-lock"), indicates that the DRC erasure rate is unacceptable. The serving sector then sends the DRC Lock Bit to the AT 104 in a message on a control channel. The control channel for a communication system in accordance with the IS-856 standard has a period of 426 ms.

In a Punctured DRC Lock embodiment, the DRC Lock Bit is updated at a rate different from the control channel period and punctured into an RPC channel one or more times every frame. The term punctured is used herein to mean sending the DRC Lock Bit instead of a RPC bit.

The AT 104 then uses the reverse link quality metric together with the forward link quality metric to make a re-pointing decision.

Re-Pointing with a Message Based DRC Lock

Access Point Processing

The processing method at the AP in accordance with one embodiment comprises three phases. In the first phase, mapping a DRC Erasure and/or a valid DRC to a binary form generates a DRC Erasure Bit. In the second phase, processing the DRC Erasure Bits generates a DRC erasure rate. In the third phase, sampling the processed DRC erasure rate every control channel period generates a DRC Lock Bit.

Figure 3:
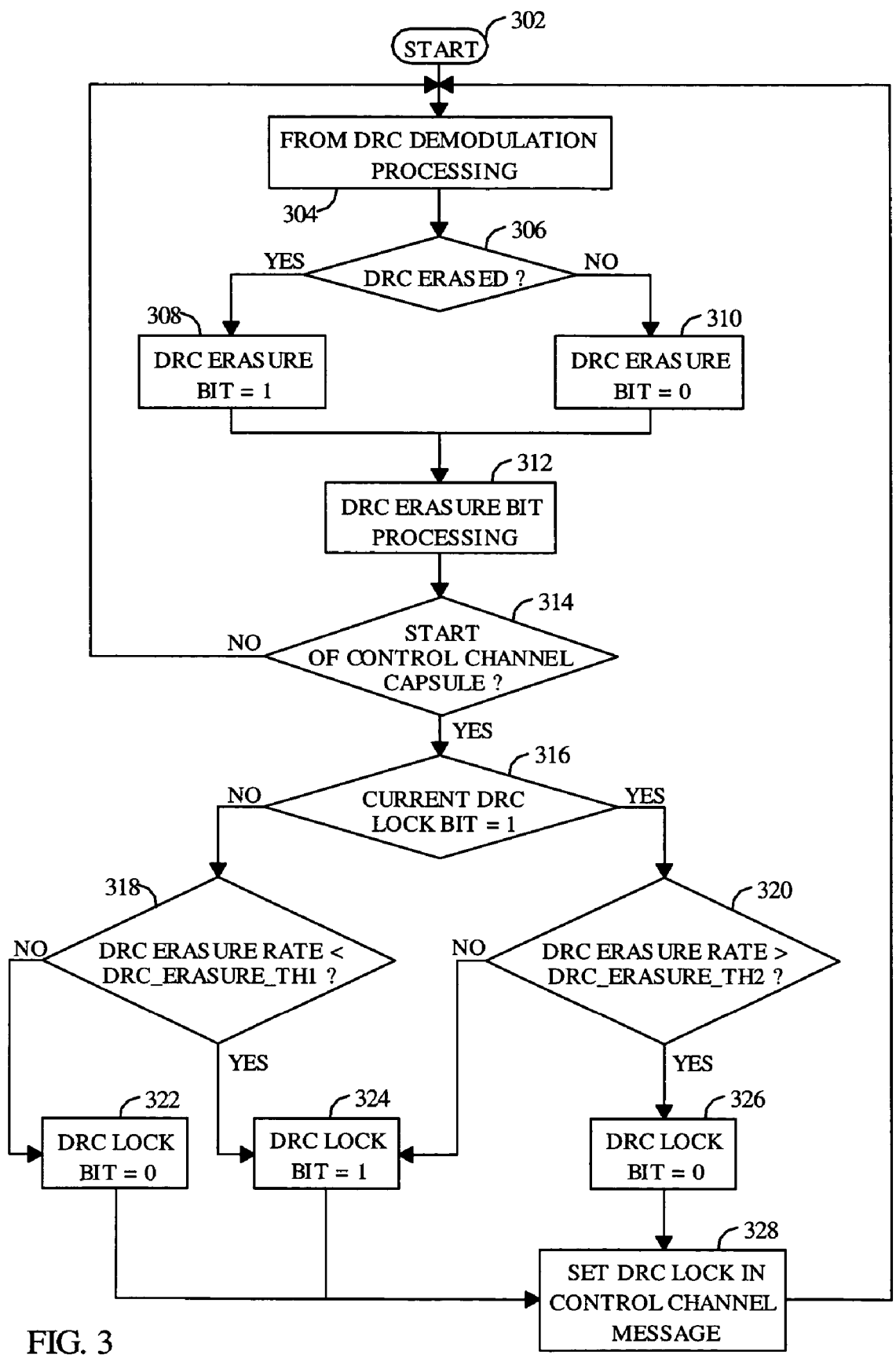
FIG. 3 illustrates an Access Point processing of a data request (DRC) for a Message Based DRC Lock method.

The above-described phases one and two are repeated every time-slot by every sector in the AT 104 active set, as illustrated in FIG. 3 in accordance with an embodiment. The method starts in step 302. The method continues in step 304.

In step 304, the AP receives an updated DRC. The method continues in step 306.

In step 306, the AP tests the updated DRC. If the DRC was erased, the method continues in step 308, otherwise, the method continues in step 310.

In step 308, the DRC Erasure Bit is assigned a value of one. The method continues in step 312.

In step 310, the DRC Erasure Bit is assigned a value of zero. The method continues in step 312.

In step 312, the DRC Erasure Bit is processed to generate a DRC erasure rate. In one embodiment, the processing comprises filtering by a filter with a pre-determined time constant. In one embodiment, the filter is realized in a digital domain. The value of the pre-determined time constant may be established in accordance with system simulation, by experiment or via other engineering methods known to one of ordinary skill in the art as an optimum in accordance with:

reliability of an estimate ensuing from a choice of the time constant, and latency of an estimate ensuing from the choice of the time constant.

The method continues in step 314.

In step 314, the system time is tested to establish the beginning of a control channel capsule. If the test is positive, the method continues in step 316, otherwise the method returns to step 304.

Steps 316 through 326 introduce hysteresis rules for generating the DRC Lock Bit. The hysteresis is introduced to avoid rapid re-pointing when the channel SINR varies rapidly. The hysteresis rules are as follows:

If the DRC Lock Bit is currently set to one, then the filtered DRC erasure rate must exceed first DRC erasure threshold (DRC_Erasure_Th2) for the DRC Lock Bit to be set to zero.

If the DRC Lock Bit is currently set to zero, then the Filtered DRC Erasure rate has to be below a second pre-determined DRC erasure threshold (DRC_Erasure_Th1) for the DRC Lock to be set to one.

In one embodiment, the values DRC_Erasure_Th1 and DRC_$_{Erasure}$_Th2 are pre-determined in accordance with the communication system simulation, by experiment or other engineering methods known to one of ordinary skill in the art. In another embodiment, the values DRC_Erasure_Th1 and DRC_Erasure_Th2 are changed in accordance with the change of the conditions of the communication link. In either embodiment, the values of DRC_Erasure_Th1 and DRC_Erasure_Th2 are selected to optimize the following requirements to:

minimize the dead-zone (when the DRC Lock Bit is not updated); and transmit the most current reverse link channel state information to the AT.

In step 316, the current DRC Lock Bit value is compared to 1. If the DRC Lock Bit value equals 1, the method continues in step 320; otherwise, the method continues in step 318.

In step 318, the DRC erasure rate is compared to the DRC_Erasure_Th1. If the DRC erasure rate is less than the DRC_Erasure Th1, the method continues in step 324; otherwise, the method continues in step 322.

In step 320, the DRC erasure rate is compared to the DRC_Erasure_Th2. If the DRC erasure rate is less than the DRC_Erasure_Th2, the method continues in step 324; otherwise, the method continues in step 326.

In step 322, the DRC Lock Bit value is set to 0. The method continues in step 328.

In step 324, the DRC Lock Bit value is set to 1. The method continues in step 328.

In step 326, the DRC Lock Bit value is set to 0. The method continues in step 328.

In step 328, the DRC Lock Bit is set at the appropriate position of the control channel message. The method returns to step 304.

Access Terminal Processing

As discussed, in one embodiment, the AT is assumed to be able to demodulate a control channel from only one sector in the AT's active set. The processing method at the AT in accordance with the embodiment comprises the phases of (i) Initialization, (ii) Credit Accumulation, and (iii) Decision.

Initialization

During the initialization stage, the AT 104 selects a sector with the best forward link quality metric, i.e., the highest SINR, as the serving sector. The AT 104 sets the DRC for the selected sector "in-lock" and initializes credits for all non-serving sectors to zero.

In one embodiment, two types of credits are defined—switching credits and monitoring credits. The credits are described in more details in the Credit Accumulation paragraph.

Figure 4:
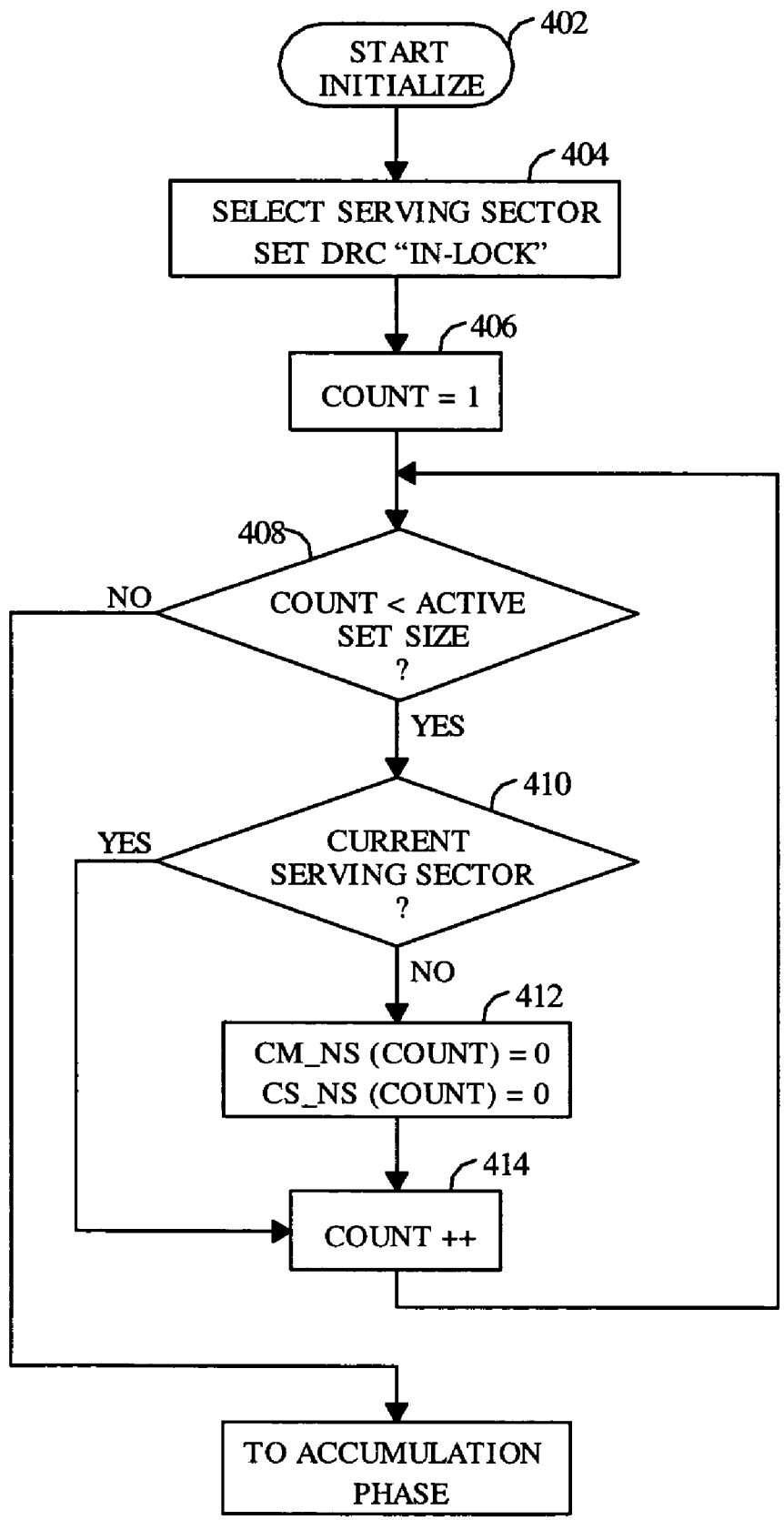
FIG. 4 illustrates an Initialization phase at an Access Terminal for the Message Based DRC Lock method.

The initialization phase in accordance with one embodiment is illustrated in FIG. 4. The method starts in step 402. The method continues in step 404.

In step 404, the AT selects a sector with the best forward link quality metric as the serving sector, and sets the sector's DRC "in-lock." The method continues in step 406.

In step 406, a variable count is set to one. The method continues in step 408.

In step 408, the variable count is tested against an active set size. If the variable count is greater than the active set size, the method continues in an accumulation phase; otherwise, the method continues in step 410.

In step 410, the inquiry is made whether the sector designated by the variable count is the current serving sector as selected in step 404. If the test is positive, the method continues in step 414; otherwise, the method continues in step 412.

In step 412, monitoring credits for a non-serving sector (CM_NS) and switching credits for a non-serving sector (CS_NS) are set to zero. The method continues in step 414.

In step 414, the variable count is incremented, and the method returns to step 408.

Credit Accumulation

As discussed, two types of credits are defined—switching credits and monitoring credits in accordance with one embodiment. Switching credits are used to qualify a non-serving sector for re-pointing, if the DRC of the non-serving sector is "in lock" with a pre-determined probability. Thus, CS_NS are incremented if:

a forward link SINR of the non-serving sector (FL_NS) is greater than a forward link SINR of the current serving sector (FL_SS) modified by a pre-determined value (FL_S-INR_Th); and a filtered RPC mean for the non-serving sector (RL_NS) is below a pre-determined threshold (RPC_Th).

CS_NS are decremented if the above conditions are not satisfied.

The pre-determined value FL_SINR_Th is selected so that re-pointing to another sector results in an increase in forward link SINR and, consequently, in an increase in an average requested data rate.

The pre-determined threshold RPC_Th is chosen so that the AP's DRC is "in-lock" with a probability PIL when the filtered RPC mean is below the RPC_Th. The relationship between the probability PIL and the threshold is determined in accordance with simulations, laboratory tests, field trails, and other engineering methods. The RPC_Th is chosen to be conservative to minimize the cost associated with re-pointing the DRC to a sector with the DRC "out-of-lock." If the AT did re-point to a sector with the DRC "out-of-lock," not only would the AT experience degraded throughput, but also a higher outage probability. The method can afford to select the RPC_Th conservatively because the monitoring credits are used to re-point to sectors with filtered RPC mean greater than the threshold but with DRC "in-lock." In one embodiment, the RPC_Th is chosen such that there is a less than 1% probability that the DRC is "out-of-lock" when the filtered RPC Mean is below the RPC_Th for any given channel conditions.

In one embodiment, the minimum value for the credits (both switching and monitoring) is zero, and the maximum for the credits is equal to a soft handoff delay or a softer handoff delay. The delay used is determined based on whether or not the non-serving sector is in the same cell as the serving sector. If the non-serving sector is in the same cell as the serving sector, then the softer handoff delay is used, and if the non-serving sector is in a cell different from the one that the serving sector is part of, then the soft-handoff delay is used.

It is possible that a filtered RPC mean for the non-serving sector is above RPC_Th, and the DRC is "in-lock" for the non-serving sector. Considering the rules for incrementing the switching credits, the switching credits will not be incremented, although a forward link SINR of the non-serving sector is greater than a forward link SINR of the current serving sector by FL_SINR_Th. Consequently, a throughput of the system is not optimized. In such a scenario, the AT uses the monitoring credits to determine whether to monitor control channels of a non-serving sector to determine whether the DRC Lock for the non-serving sector is "in-lock." Therefore, the monitoring credits for a non-serving sector (CM_NS) are incremented if:

the forward link SINR of the non-serving sector (FL_NS) is greater than the forward link SINR of the current serving sector (FL_SS) by a FL_SINR_Th; and the filtered RPC mean for the non-serving sector (RL_NS) is above the RPC_Th; and the filtered RPC mean for the current serving sector (RL_SS) is below the RPC_Th.

CM_NS are decremented if the above conditions are not satisfied.

Figure 5:
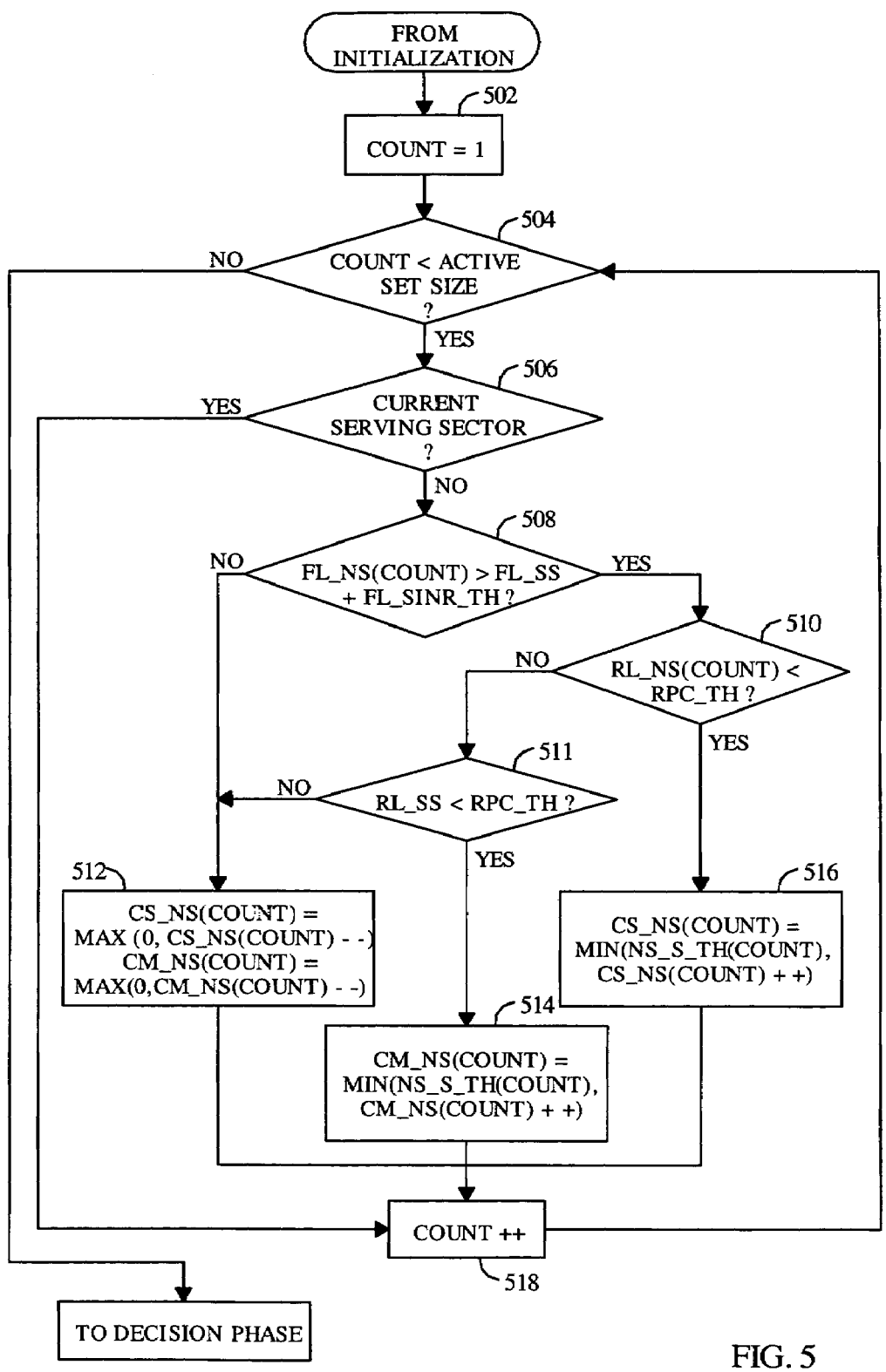
FIG. 5 illustrates a Credit Accumulation phase at the Access Terminal for the Message Based Data Request Channel Lock method.

The credits, initialized to zero in the Initialization phase, are accumulated during the Credit Accumulation phase. The credit accumulation phase, in accordance with one embodiment, is illustrated in FIG. 5. In step 502, a variable count is set to one. The method continues in step 504.

In step 504, the variable count is tested against an active set size. If the variable count is greater than the active set size, the method continues in decision phase; otherwise, the method continues in step 506.

In step 506, the inquiry is made whether a sector designated by the variable count is the current serving sector. If the test is positive, the method continues in step 518; otherwise, the method continues in step 508.

In step 508, a forward link SINR of a sector designated by the variable count is compared against forward link SINR of the current serving sector modified by the FL_SINR_Th. If the forward link SINR of the sector designated by the variable count is greater than the forward link SINR of the current serving sector modified by the FL_SINR_Th, the method continues in step 510; otherwise, the method continues in step 512.

In step 510, a reverse link filtered RPC mean of the sector designated by the variable count is compared against the RPC_Th. If the reverse link filtered RPC mean of the sector designated by the variable count is greater than the RPC_Th, the method continues in step 511; otherwise, the method continues in step 516.

In step 511, a reverse link filtered RPC mean for the current serving sector is compared against the RPC_Th. If the reverse link filtered RPC mean for the current serving sector is greater than the RPC_Th, the method continues in step 512; otherwise, the method continues in step 514.

In step 512, values of CS_NS and CM_NS identified by the variable count are decremented by one, and set to the maximum of 0 and the decremented value. The method continues in step 518.

In step 514, the values of CS_NS and CM_NS identified by the variable count are incremented by one and set to the minimum of the soft (or softer) handoff delay (NS_S_Th) and the incremented value. The method continues in step 518.

In step 516, the value of CS_NS identified by the variable count is incremented by one, and set to the minimum of the soft (or softer) handoff delay (NS_S_Th) and the decremented value. The method continues in step 518.

In step 518, the variable count is incremented by one and the method returns to step 504.

Decision

Figure 6:
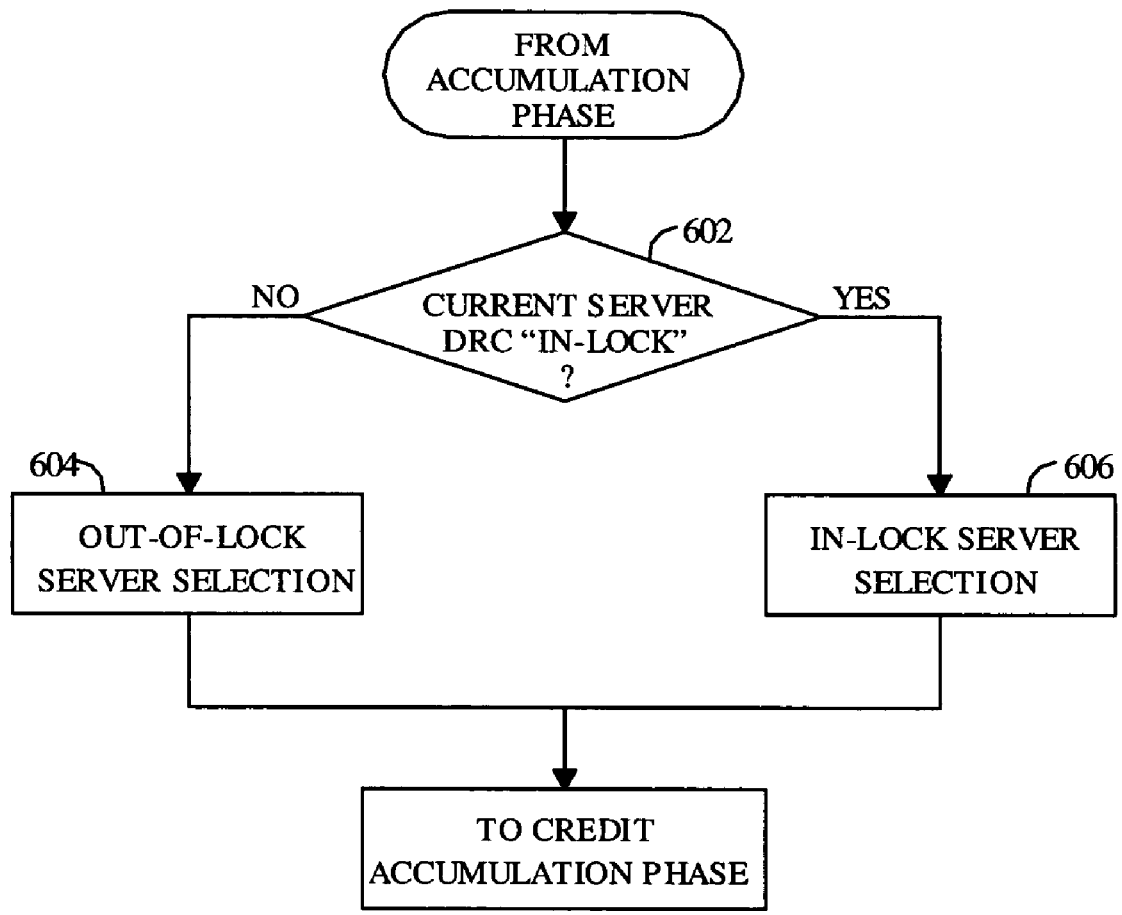
FIG. 6 illustrates a Decision phase at the Access Terminal for the Message Based DRC Lock method.

In one embodiment, the re-pointing decision rules depend on the DRC Lock Bit of the current serving sector. Consequently, referring to FIG. 6, in step 602, a DRC Lock Bit of the current serving sector is tested. If the DRC Lock Bit of the current serving sector is "out-of-lock," the method continues in step 604; otherwise, the method continues in step 606.

In step 604, the "out-of-lock" server selection method is initialized. The method is described in detail with reference to FIG. 9. The method returns to the credit accumulation phase.

In step 606, the "in-lock" server selection method is initialized. The method is described in detail with reference to FIGS. 7 and 8. The method returns to the credit accumulation phase.

"In-Lock" Server Selection

If the DRC Lock Bit from the current serving sector is "in-lock", the decision to re-point to a non-serving sector is made if the non-serving sector provides higher FL_SINR and an "in-lock" DRC Lock Bit. To carry out the decision, the AT first ascertains if any of the non-serving sectors has switching credits greater than a threshold determined by the soft/softer delay. (This, threshold is the same for both the switching and monitoring credits.) If at least one of the non-serving sectors has switching credits greater than the threshold, the AT re-points its DRC to the sector with the highest switching credits. In one embodiment, if two or more non-serving sectors have equal switching credits, the sector with the highest quality reverse link is selected. The quality of the reverse link is determined in accordance with the filtered RPC mean. Lower filtered RPC mean indicates a better quality of the reverse link. In another embodiment, if two or more non-serving sectors have equal switching credits, the sector with the highest quality forward link is selected.

If none of the non-serving sectors has sufficient switching credits to mandate re-pointing, the AT ascertains how many of the non-serving sectors have monitoring credits greater than the threshold. If at least one of the non-serving sectors has monitoring credits greater than the threshold, the AT monitors the control channel from those non-serving sectors during the next control channel cycle. In one embodiment, if two or more non-serving sectors have equal switching credits, a sector with the highest quality reverse link is selected for the monitoring. The quality of the reverse link is determined in accordance with the filtered RPC mean. In another embodiment, if two or more non-serving sectors have equal switching credits, a sector with the highest quality forward link is selected for the monitoring. If the DRC for the monitored sector is "in-lock," the AT re-points to the monitored sector. Following the re-pointing the AT resets all the switching and monitoring credits.

If none of the non-serving sectors has either sufficient switching credits or monitoring credits, the AT continues pointing its DRC to the current serving Access Point.

Figure 7:
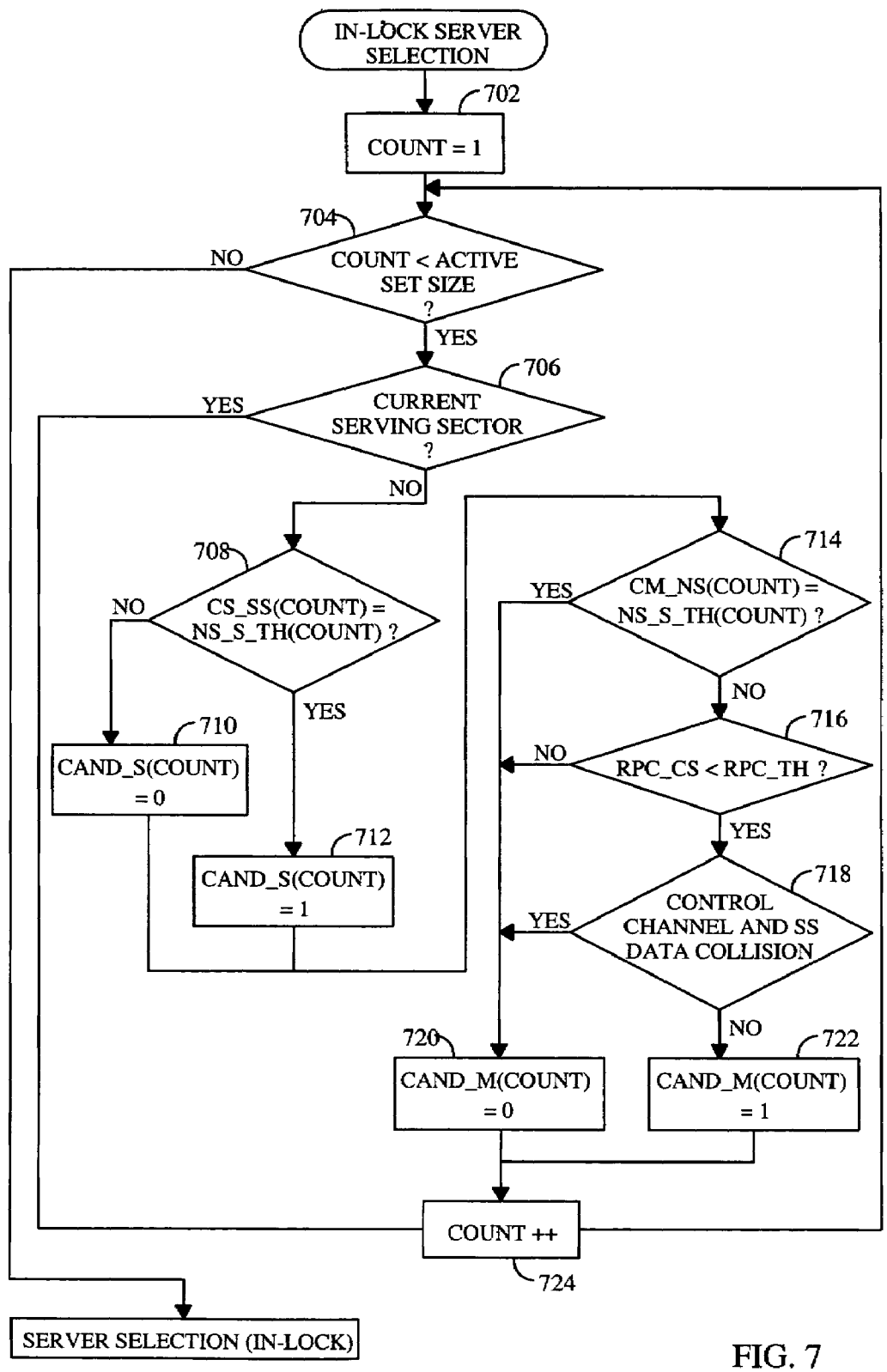
FIGS. 7 and 8 illustrate the Decision phase for a sector selection when the DRC of a current serving sector is "in-lock" for the Message Based DRC Lock method.
Figure 8:
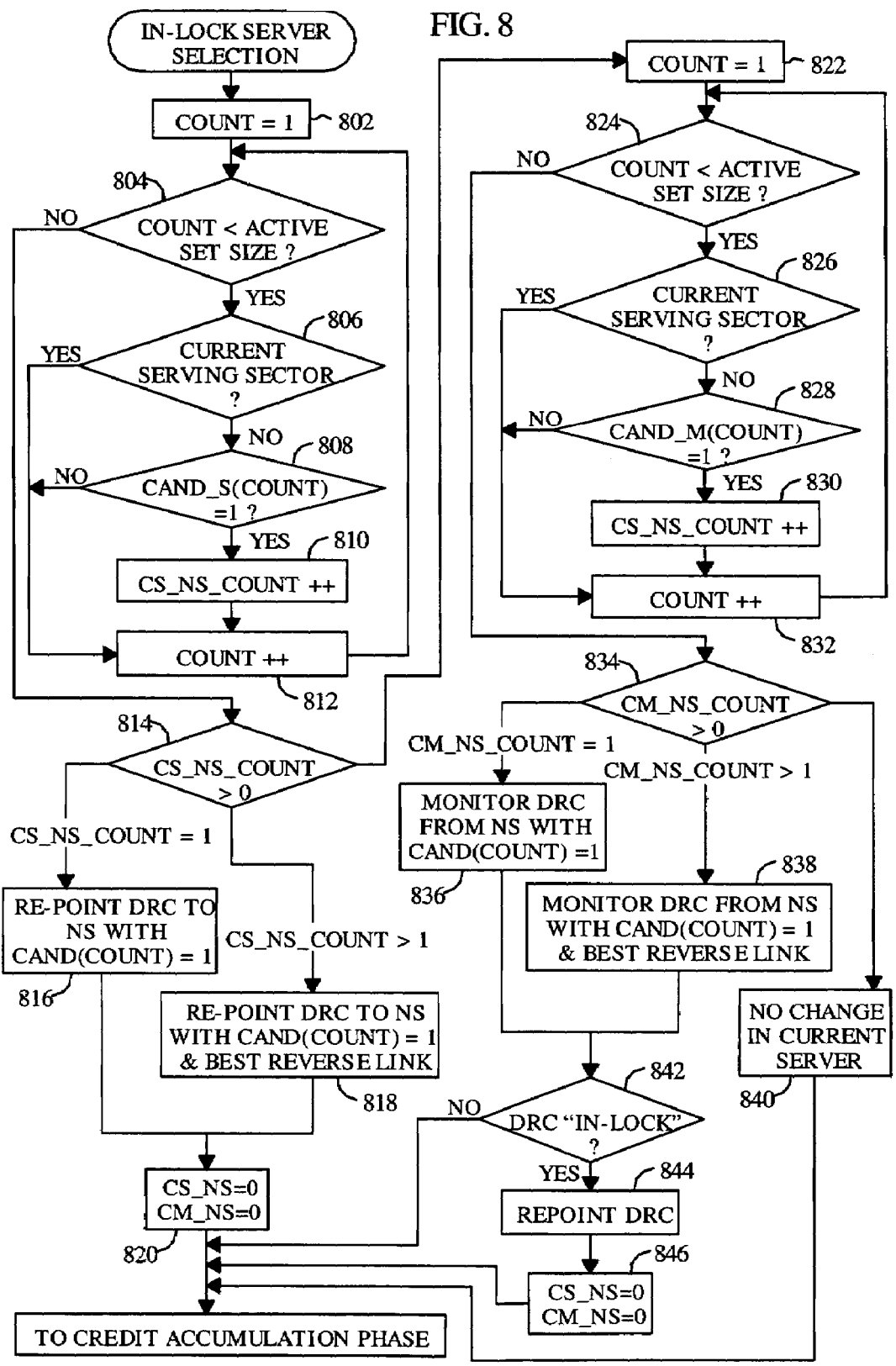

The decision phase in accordance with one embodiment is illustrated in FIGS. 7 and 8. In accordance with FIG. 7, a non-serving sector is made a candidate for re-pointing if the non-serving sector's switching credits are equal to the soft (or softer) handoff delay (NS_S_Th) for the non-serving sector. A non-serving sector is made a candidate for a control channel monitoring if the non-serving sector's monitoring credits are equal to the soft (or softer) handoff delay (NS_S_Th) for the non-serving sector and the filtered RPC mean of the non-serving sector is above RPC_Th. This ensures that the AT is in reliable communication with the current serving sector when it attempts to demodulate the synchronous control channel from a non-serving sector. These two requirements ensure that the DRC from the non-serving sector is "in-lock" with a probability PIL.

Furthermore, in one embodiment, a data packet may span two control channel cycles and, consequently, the data transmission from the current serving sector may collide with the control channel transmission from the sector to be monitored.

Consequently, the AT further determines whether there is potential for a collision between the data on the control channel to be monitored and the data form the current serving sector. If the AT determines that the data transmission from the current serving sector would collide with the transmission of the control channel from the non-serving sector to be monitored, then the AT does not monitor the control channel from the non-serving sector. Otherwise, the AT would monitor the control channel from the non-serving sector.

In step 702, a variable count is set to one. The method continues in step 704.

In step 704, the variable count is tested against an active set size. If the variable count is greater than the active set size, the method continues in server selection of FIG. 8; otherwise, the method continues in step 706.

In step 706, an inquiry is made whether a sector designated by the variable count is the current serving sector. If the test is positive, the method continues in step 724; otherwise, the method continues in step 708.

In step 708, a value of the variable CS_SS identified by the variable count is compared against the soft (or softer) handoff delay (NS_S_Th) for the non-serving sector. If the value of the variable CS_SS is not equal to the NS_S_Th, the method continues in step 710; otherwise, the method continues in step 712.

In step 710, a value of the variable Cand_S identified by the variable count is set to 0. The method continues in step 714.

In step 712, a value of the variable Cand_S identified by the variable count is set to 1. The method continues in step 714.

In step 714, a value of the variable CM_NS identified by the variable count is compared against the soft (or softer) handoff delay (NS_S_Th) for the non-serving sector. If the value of the variable CM_NS is not equal to the NS_S_Th for the non-serving sector, the method continues in step 716; otherwise, the method continues in step 720.

In step 716, the filtered RPC mean of the current serving sector (RPC_CS) identified by the variable count is compared against an RPC threshold (RPC_Th). If the RPC_CS is less than the RPC_Th, the method continues in step 718; otherwise, the method continues in step 720.

In step 718, the AT determines whether the data on the control channel to be monitored and the data from the current serving sector collide. If the AT determines that the data transmission from the current serving sector would collide with the transmission of the control channel from the non serving sector to be monitored, then the method continues in step 720. Otherwise, the method continues in step 722.

In step 720, a value of the variable Cand_M identified by the variable count is set to 0. The method continues in step 724.

In step 722, a value of the variable Cand_M identified by the variable count is set to 1. The method continues in step 724.

In step 724, the variable count is incremented, and the method returns to step 704.

Referring to FIG. 8, the "in-lock" selection from FIG. 7 continues. In accordance with FIG. 8, the AT ascertains which sectors are candidates for re-pointing and/or monitoring, and carries out the re-pointing decision.

In step 802, where a variable count is set to one, the method continues in step 804, in which the variable count is tested against an active set size. If the variable count is greater than the active set size, the method continues in step 814; otherwise, the method continues in step 806.

In step 806, an inquiry is made whether the sector designated by the variable count is the current serving sector. If the test is positive, the method continues in step 812; otherwise, the method continues in step 808.

In step 808, a variable Cand_S identified by the variable count is compared to one. If the variable Cand_S identified by the variable count is equal to one, the method continues in step 810; otherwise the method continues in step 812.

In step 810, a variable CS_NS_count is incremented by one. The method continues in step 812.

In step 812, the variable count is incremented, and the method returns to step 804.

In step 814, the value of the variable CS_NS_count is ascertained. If the value of the variable CS_NS_count is equal to 1, the method continues in step 816. If the value of the variable CS_NS_count is greater that 1, the method continues in step 818. Otherwise, the method continues in step 822.

In step 816, the AT re-points the DRC to the candidate sector identified by the variable count. The method continues in step 820.

In step 818, the AT re-points the DRC to the candidate sector identified by the variable count that has the highest quality reverse link in accordance with the sector's reverse link's filtered RPC mean. The method continues in step 820.

In step 820, the variables CS_NS and the variables CM_NS are set to zero. The method returns to the credit accumulation phase.

In step 822, a variable count is set to one. The method continues in step 824.

In step 824, the variable count is tested against an active set size. If the variable count is greater than the active set size, the method continues in step 834; otherwise, the method continues in step 826.

In step 826, an inquiry is made whether the sector designated by the variable count is the current serving sector. If the test is positive, the method continues in step 832; otherwise, the method continues in step 828.

In step 828, a variable Cand_M identified by the variable count is compared to one. If the variable Cand_M identified by the variable count is equal to one, the method continues in step 830; otherwise the method continues in step 832.

In step 830, a variable CM_NS_count is incremented. The method continues in step 832.

In step 832, the variable count is incremented, and the method returns to step 824.

In step 834, the value of the variable CM_NS_count is ascertained. If the value of the variable CM_NS_count is equal to 1, the method continues in step 836. If the value of the variable CM_NS_count is greater that 1, the method continues in step 838. If the value of the variable CM_NS_count is equal to 0, the method continues in step 840.

In step 836, the AT monitors the DRC from the candidate sector identified by the variable count. The method continues in step 842.

In step 838, the AT monitors the DRC from the candidate sector identified by the variable count that has the highest quality reverse link in accordance with the AP's reverse link's filtered RPC mean. The method continues in step 842.

In step 840, the AT makes the-decision not to re-point to a different sector. The method returns to credit accumulation.

In step 842, the DRC from the candidate sector is evaluated. If the DRC value is "in lock," the method continues in step 844; otherwise, the method returns to credit accumulation.

In step 844, the AT re-points the DRC to the candidate sector. The method continues in step 846.

In step 846, the variables CS_NS and the variables CM_NS are set to zero. The method returns to credit accumulation.

"Out-of-Lock" Server Selection

If the DRC from the current serving sector is "out-of-lock," the decision to re-point to a non-serving sector is made if the non-serving sector provides higher FL_SINR and better quality reverse link, as determined by the switching credits. To carry out the decision, the AT first ascertains those non-serving sectors that have switching credits greater than zero. If at least one of the non-serving sectors has switching credits greater than zero, the AT re-points the DRC to the sector with the highest switching credits. In one embodiment, if two or more non-serving sectors have equal switching credits, a sector with the highest quality reverse link is selected. The quality of the reverse link is determined in accordance with the reverse link's filtered RPC mean. In another embodiment, if two or more non-serving sectors have equal switching credits, a sector with the highest quality forward link is selected.

If none of the non-serving sectors has switching credits greater than zero, the AT ascertains those non-serving sectors that have monitoring credits greater than zero. If at least one of the non-serving sectors has monitoring credits greater than zero, the AT monitors the sector with the highest monitoring credits. In one embodiment, if two or more non-serving sectors have equal monitoring credits, the sector with the highest quality reverse link is selected for the monitoring. The quality of the reverse link is determined in accordance with the filtered RPC mean. In another embodiment, if two or more non-serving sectors have equal monitoring credits, the sector with the highest quality forward link is selected for the monitoring. If the DRC for the monitored sector is "in-lock," the AT re-points to the monitored sector. On re-pointing the DRC the AT resets all the switching and re-pointing credits.

If none of the non-serving sectors has either sufficient switching credits or monitoring credits, the AT continues pointing its DRC to the current serving sector.

Figure 9:
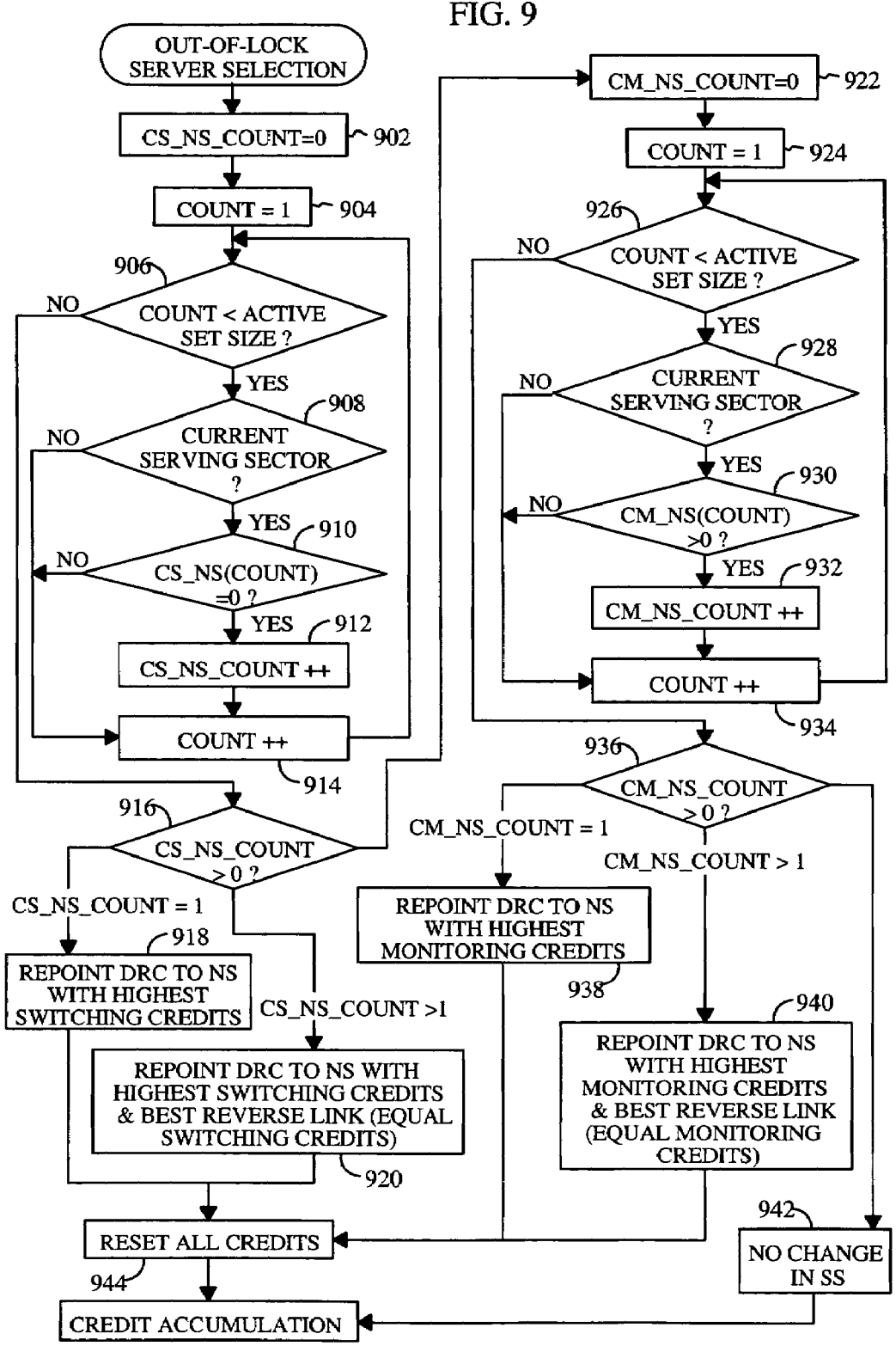
FIG. 9 illustrates the Decision phase for the sector selection when the DRC of the current serving sector is "out-of-lock" for the Message Based DRC Lock method.

The "out-of-lock" sector selection in accordance with one embodiment is illustrated in FIG. 9. In step 902, a variable CS_NS_COUNT is set to zero. The method continues in step 904.

In step 904, the variable count is set to one. The method continues in step 906.

In step 906, the variable count is tested against an active set size. If the variable count is greater than the active set size, the method continues in step 916; otherwise, the method continues in step 908.

In step 908, an inquiry is made whether the sector designated by the variable count is the current serving sector. If the test is positive, the method continues in step 910; otherwise, the method continues in step 914.

In step 910, a variable CS_NS identified by the variable count is compared to zero. If the variable CS_NS identified by the variable count is equal to zero, the method continues in step 912; otherwise the method continues in step 914.

In step 912, a variable CS_NS_count is incremented. The method continues in step 914.

In step 914, the variable count is incremented, and the method returns to step 906.

In step 916, the value of the variable CS_NS_count is ascertained. If the value of the variable CS_NS_count is equal to 1, the method continues in step 918. If the value of the variable CS_NS_count is greater that 1, the method continues in step 920. Otherwise, the method continues in step 922.

In step 918, the AT re-points the DRC to the candidate sector identified by the variable count. The method continues in step 944.

In step 920, the AT re-points the DRC to the candidate sector identified by the variable count that has the highest quality reverse link in accordance with the AP's reverse link's filtered RPC mean. The method continues in step 944.

In step 922, a variable CM_NS_count is set to zero. The method continues in step 924.

In step 924, a variable count is set to one. The method continues in step 926.

In step 926, the variable count is tested against an active set size. If the variable count is greater than the active set size, the method continues in step 936, otherwise, the method continues in step 928.

In step 928, an inquiry is made whether the sector designated by the variable count is the current serving sector. If the test is negative, the method continues in step 934; otherwise, the method continues in step 930.

In step 930, a variable CM_NS identified by the variable count is compared to zero. If the variable CM_NS identified by the variable count is less than zero, the method continues in step 934; otherwise the method continues in step 932.

In step 932, a variable CM_NS_count is incremented. The method continues in step 934.

In step 934, the variable count is incremented, and the method returns to step 924.

In step 936, the value of the variable CM_NS_count is ascertained. If the value of the variable CM_NS_count is equal to 1, the method continues in step 938. If the value of the variable CM_NS_count is greater that 1, the method continues in step 940. If the value of the variable CM_N-S_count is equal to 0, the method continues in step 942.

In step 938, the AT re-points the DRC to the candidate sector identified by the variable count. The method continues in step 944.

In step 940, the AT re-points the DRC to the candidate sector identified by the variable count that has the highest quality reverse link in accordance with the AP's reverse link's filtered RPC mean. The method continues in step 944.

In step 942, the AT makes the decision not to re-point to a different sector. The method returns to credit accumulation.

Access Terminal Processing

In another embodiment, the AT is assumed to be able to demodulate a control channel from each sector in the AT's active set. The processing method at the AT in accordance with the embodiment comprises the phases of (i) Initialization, (ii) Credit Accumulation, and (iii) Decision.

Initialization

During the initialization stage, the AT 104 selects the AP with the best forward link quality metric, i.e., the highest SINR. The AT 104 sets the DRC "in-lock," for the selected AP. The AT 104 then initializes credits for all non-serving sectors to zero.

Because the AT is able to demodulate a control channel from each sector in the AT's active set, thus determining the DRC Lock Bit value, there is no need for monitoring credits and only switching credits are defined. The switching credits are described in more details in the Credit Accumulation paragraph. Consequently, the initialization phase in accordance with the embodiment is carried out according to FIG. 4 and the accompanying text, except for step 412. In step 412, only the switching credits for a non-serving sector (CS_NS) are set to zero.

Credit Accumulation

As discussed, only switching credits are required in accordance with the embodiment. Switching credits are used to qualify the non-serving sector for re-pointing if the DRC of the non-serving sector is "in lock." Consequently, CS_NS are incremented if:

a forward link SINR of the non-serving sector (FL_NS) is greater than a forward link SINR of the current serving sector by a pre-determined value (FL_SINR_Th); and a DRC Lock Bit of the non-serving sector is "in-lock."

The pre-determined value FL_SINR_Th is selected so that re-pointing to a new sector results in an increase in forward link SINR and, consequently, in an increase in an average requested data rate. CS_NS are decremented if the above conditions are not satisfied.

In one embodiment, the switching credits minimum value is zero and the maximum value is equal to a soft handoff delay if re-pointing to the particular sector would constitute a soft handoff, or a softer handoff delay if re-pointing to the particular AP would constitute a softer handoff.

Figure 10:
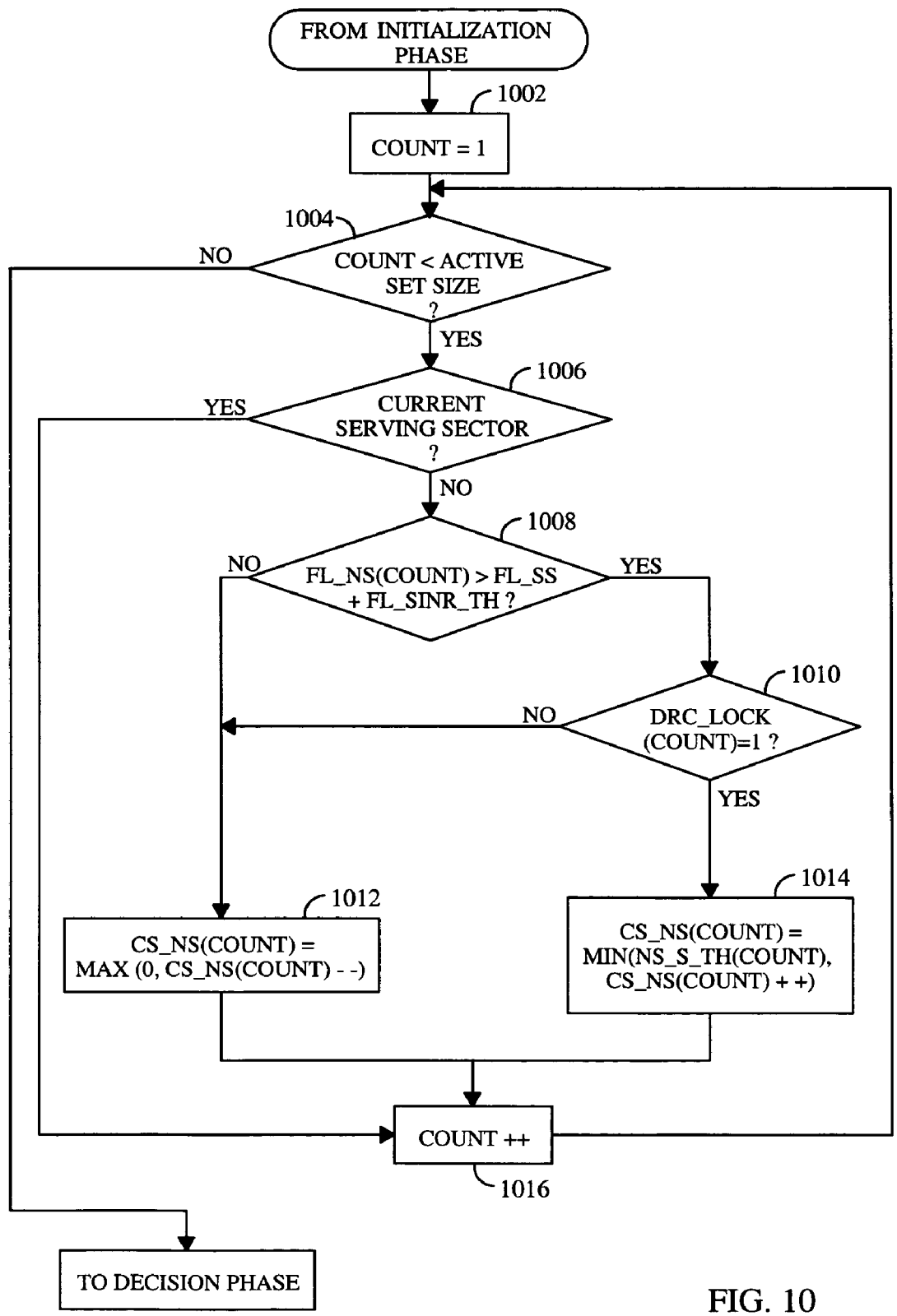
FIG. 10 illustrates the Credit Accumulation phase at the Access Terminal for the Message Based DRC Lock method in accordance with another embodiment.

The credits, initialized to zero in the Initialization phase are accumulated during the Credit Accumulation phase. The credit accumulation phase in accordance with one embodiment is illustrated in FIG. 10. In step 1002, a variable count is set to one. The method continues in step 1004.

In step 1004, the variable count is tested against an active set size. If the variable count is greater than the active set size, the method continues in decision phase; otherwise, the method continues in step 1006.

In step 1006, the inquiry is made whether the sector designated by the variable count is the current serving sector. If the test is positive, the method continues in step 1016; otherwise, the method continues in step 1008.

In step 1008, a forward link SINR of the sector designated by the variable count is compared against forward link SINR of the current serving sector modified by the FL_SINR_Th. If the forward link SINR of the sector designated by the variable count is greater than the forward link SINR of the current serving sector modified by the FL_SINR_Th, the method continues in step 1010; otherwise, the method continues in step 1012.

In step 1010, a DRC Lock Bit of the sector designated by the variable count is compared against one. If the DRC Lock Bit of the sector designated by the variable count is equal to one, the method continues in step 1014; otherwise, the method continues in step 1012.

In step 1012, the value of CS_NS identified by the variable count is decremented by one and set to the maximum of 0 and the decremented value. The method continues in step 1016.

In step 1014, the value of CS_NS identified by the variable count are incremented by one and set to the minimum of the soft (or softer) handoff delay and the incremented value. The method continues in step 1016.

In step 1016, the variable count is incremented by one and the method returns to step 1004.

Decision

In accordance with the embodiment, the re-pointing decision rules depend on the DRC Lock State of the current serving sector. Consequently, the decision phase in accordance with the embodiment is carried out according to FIG. 6 and accompanying text.

"In-Lock" AP Selection

If the DRC from the current serving sector is "in-lock," the decision to re-point to a non-serving sector is made if the non-serving sector provides higher FL_SINR and an "in-lock" DRC. To carry out the decision, the AT first ascertains if any of the non-serving sectors has switching credits greater than a threshold determined by the soft/softer delay. If at least one of the non-serving sectors has switching credits greater than the threshold, the AT re-points its DRC to the AP with the highest switching credits. In one embodiment, if two or more non-serving sectors have equal switching credits, a sector with the highest quality reverse link is selected. The quality of the reverse link is determined in accordance with the filtered RPC mean. In another embodiment, if two or more non-serving sectors have equal switching credits, a sector with the highest quality forward link is selected.

To avoid limiting the re-pointing rate to a control channel interval (256 time-time-slots for IS-856), a non-serving sector is further made a candidate for re-pointing between control channel intervals according to the following rules:

the number of time-slots since the last control channel (CC) exceeds a threshold $N_c$; and the filtered RPC mean for the non-serving sector (RL_NS) is less than the RPC_Th.

The RPC_Th is chosen such that the DRC for the non-serving sector is "in-lock" with a probability PIL if the filtered RPC mean is below RPC_Th. In one embodiment, the Nc is equal to 64.

If none of the non-serving sectors has sufficient switching credits, the AT continues pointing its DRC to the current serving sector. On re-pointing the DRC the AT resets all the switching credits.

Figure 11:
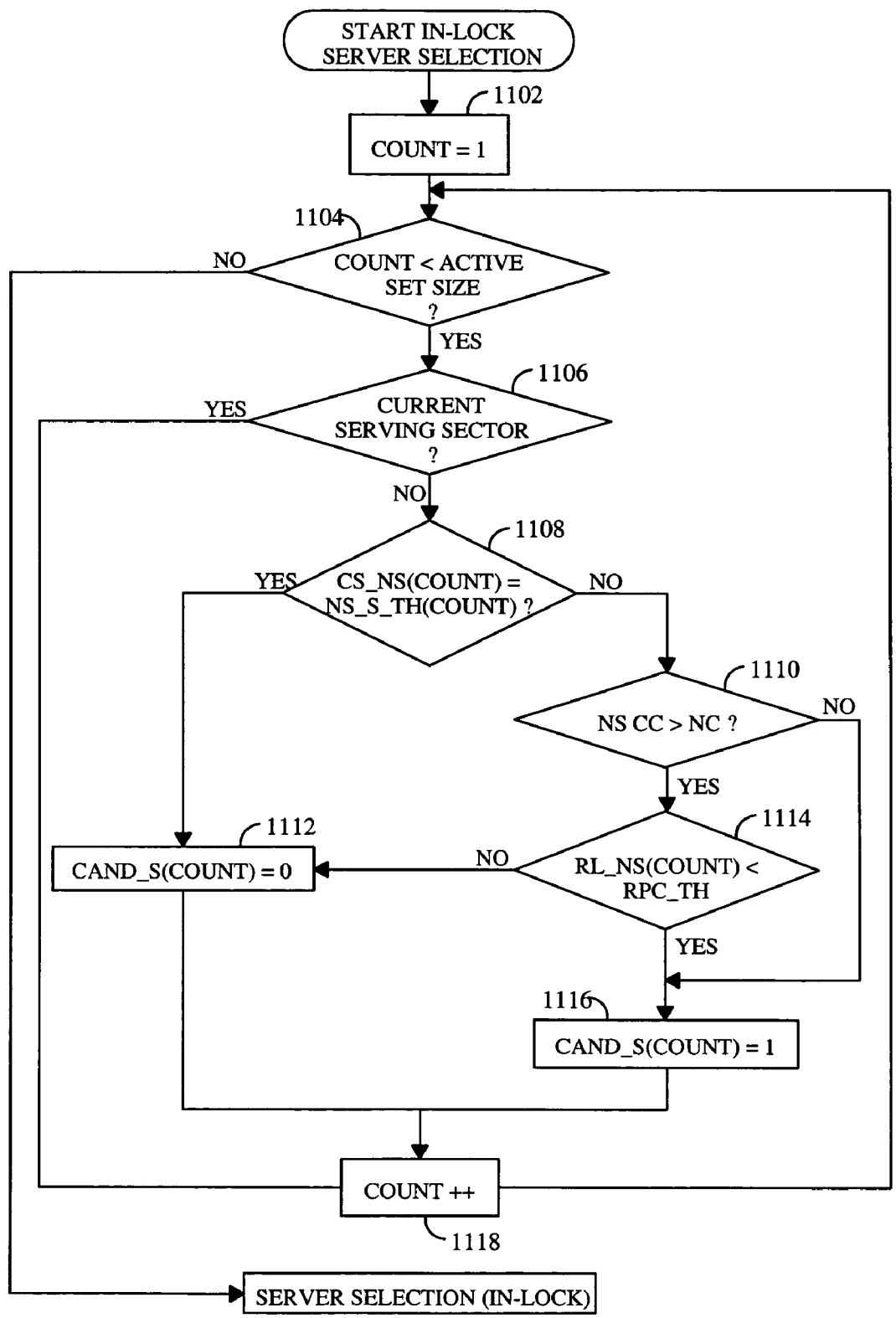
FIG. 11 illustrates the Decision phase for sector selection when the DRC from the current serving sector is "in-lock" for the Message Based DRC Lock method in accordance with another embodiment.

The candidate determination in accordance with the embodiment is illustrated in FIG. 11. In step 1102, a variable count is set to one. The method continues in step 1104.

In step 1104, the variable count is tested against an active set size. If the variable count is greater than the active set size, the method continues in server selection as described below; otherwise, the method continues in step 1106.

In step 1106, an inquiry is made whether the sector designated by the variable count is the current serving sector. If the test is positive, the method continues in step 1118; otherwise, the method continues in step 1108.

In step 1108, a value of the variable CS_NS identified by the variable count is compared against the soft (or softer) handoff delay (NS_S_Th) for the non-serving sector. If the value of the variable CS_NS is not equal to the NS_S_Th for the non-serving sector, the method continues in step 1110; otherwise, the method continues in step 1112.

In step 1110, a value of the variable identifying the number of time-slots since the last control channel (CC) is compared against the NC. If the CC is greater than the Nc, the method continues in step 1114; otherwise, the method continues in step 1116.

In step 1112, a value of the variable Cand_S identified by the variable count is set to zero. The method continues in step 1118.

In step 1114, a filtered RPC mean of the non-serving sector (RL_NS) identified by the variable count is compared against an RPC threshold (RPC_Th). If the RL_NS is greater than the RPC_TH, the method continues in step 1112; otherwise, the method continues in step 1116.

In step 1116, a value of the variable Cand_S identified by the variable count is set to one. The method continues in step 1118.

In step 1118, the variable count is incremented, and the method returns to step 1104.

In accordance with the decision rules, the AT ascertains which sectors are candidates for re-pointing, and carries out the re-pointing decision. The decision phase in accordance with the embodiment is carried out according to FIG. 9 and the accompanying text, with the following modifications. Because the embodiment does not use the monitoring credits, steps 922 through 946 are deleted. Consequently, in step 914, if the value of the variable CS_NS_count is equal to zero, the method continues pointing to the current serving Access Point, and then returns to the Credit Accumulation phase.

"Out-of-Lock" AP Selection

If the DRC from the current serving sector is "out-of-lock" the decision to re-point to a non-serving sector is made if the non-serving sector provides higher FL_SINR and better quality reverse link, as determined by the switching credits. To carry out the decision, the AT first ascertains those non-serving sectors that have switching credits greater than zero. If at least one of the non-serving sectors has switching credits greater than zero, the AT re-points its DRC to the sector with the highest switching credits. In one embodiment, if two or more non-serving sectors have equal switching credits, a sector with the highest quality reverse link is selected. The quality of the reverse link is determined in accordance with the reverse link's filtered RPC mean. In another embodiment, if two or more non-serving sectors have equal switching credits, a sector with the highest quality forward link is selected.

If none of the non-serving sectors has sufficient switching credits, the AT continues pointing its DRC to the current serving Access Point.

The decision phase in accordance with the embodiment is carried out according to FIG. 9 and the accompanying text, with the following modifications. Because the embodiment does not use the monitoring credits, steps 922 through 946 are deleted. Consequently, in step 914, if the value of the variable CS_NS_count is equal to zero, the method continues pointing to the current serving Access Point, and then returns to the Credit Accumulation phase.

Further Extension

Figure 12:
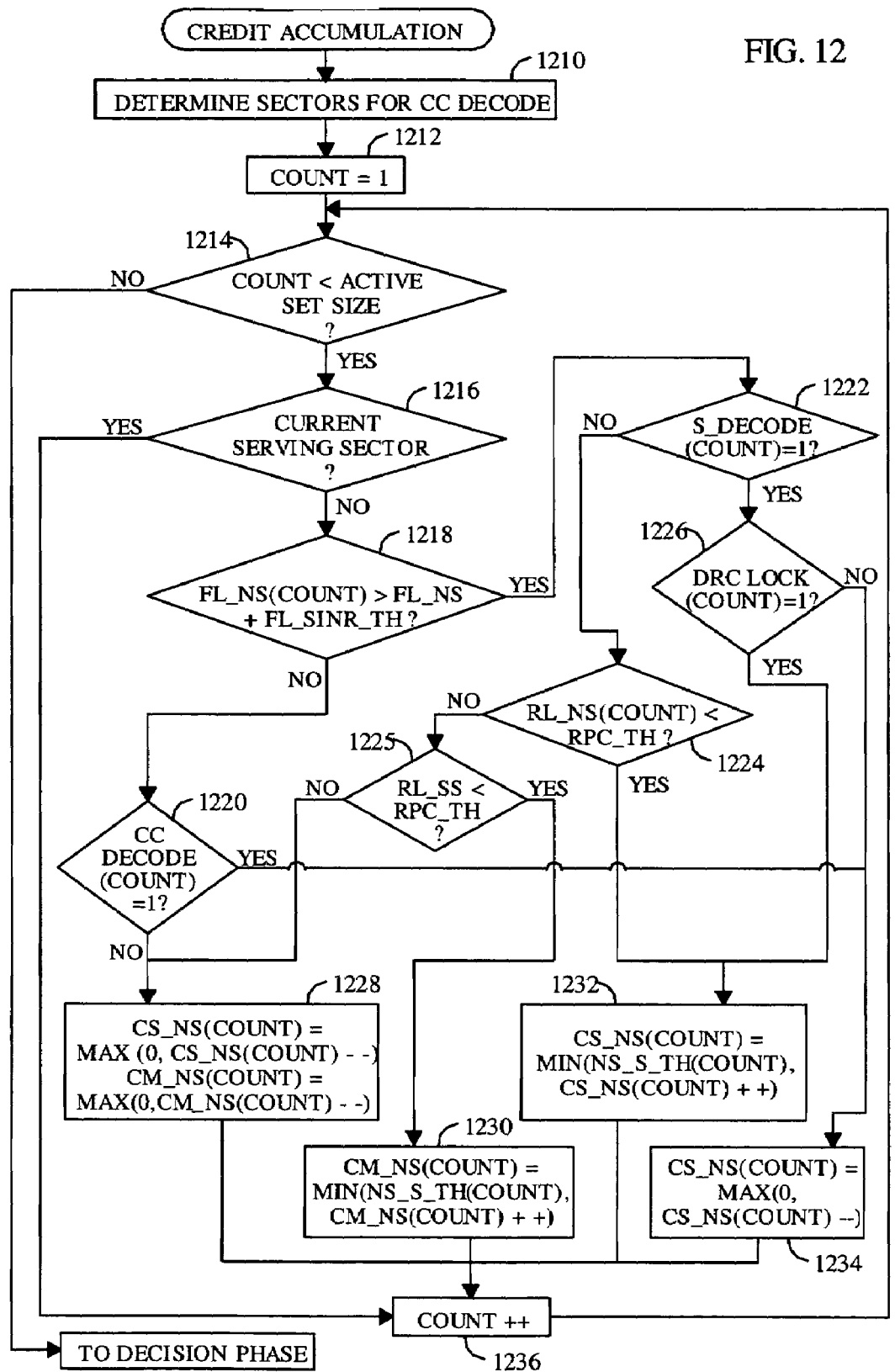
FIG. 12 illustrates the Credit Accumulation phase at the Access Terminal for the Message Based DRC Lock method in accordance with yet another embodiment.

One skilled in the art recognizes that the concepts explained in the two above-described embodiments can be utilized to devise a hybrid method in which the AT would be able to demodulate a control channel from at least two sectors in the AT's active set. A modification to a Credit Accumulation phase as required in one embodiment is illustrated in FIG. 12. All other phases do not require any modifications.

In step 1210, the sectors control channels to be demodulated are determined. In one embodiment, the determination is carried out in accordance with the sector's filtered forward link SINR. Sectors are sorted based on their filtered forward link SINR. Then the AT selects the number of sectors it is able to demodulate as the sectors with the highest SINR.

In step 1212, a variable count is set to one. The method continues in step 1214.

In step 1214, the variable count is tested against an active set size. If the variable count is greater than the active set size, the method continues in decision phase; otherwise, the method continues in step 1216.

In step 1216, the inquiry is made whether a sector designated by the variable count is the current serving sector. If the test is positive, the method continues in step 1236; otherwise, the method continues in step 1218.

In step 1218, a forward link SINR of a sector designated by the variable count is compared against forward link SINR of the current serving sector modified by the FL_SINR_Th. If the forward link SINR of the sector designated by the variable count is greater than the forward link SINR of the current serving sector modified by the FL_SINR_Th, the method continues in step 1222; otherwise, the method continues in step 1220.

In step 1220, a test whether a sector identified by the variable count was selected for demodulating is performed. If the test is negative, the method continues in step 1228; otherwise the method continues in step 1234.

In step 1222, a test whether a sector identified by the variable count was selected for demodulating is performed. If the test is negative, the method continues in step 1224; otherwise the method continues in step 1226.

In step 1224, a reverse link filtered RPC mean of the sector designated by the variable count is compared against the RPC_Th. If the reverse link filtered RPC mean of the sector designated by the variable count is greater than the RPC_Th, the method continues in step 1225; otherwise, the method continues in step 1232.

In step 1225, a reverse link filtered RPC mean for the current serving sector is compared against the RPC_Th. If the reverse link filtered RPC mean for the current serving sector is greater than the RPC_Th, the method continues in step 1228; otherwise, the method continues in step 1230.

In step 1226, a DRC Lock of the sector identified by the variable count is compared to one. If the DRC Lock of the sector identified by the variable count is equal to one, the method continues in step 1232; otherwise the method continues in step 1234.

In step 1228, values of CS_NS and CM_NS identified by the variable count are decremented by one, and set to the maximum of 0 and the decremented value. The method continues in step 1236.

In step 1230, the values of CS_NS and CM_NS identified by the variable count are incremented by one, and set to the minimum of the soft (or softer) handoff delay (NS_S_Th) and the incremented value. The method continues in step 1236.

In step 1232, the value of CS_NS identified by the variable count is incremented by one and set to the minimum of the soft (or softer) handoff delay (NS_S_Th) and the decremented value. The method continues in step 1236.

In step 1234, the value of CS_NS identified by the variable count is decremented by one, and set to the maximum of 0 and the decremented value. The method continues in step 1236.

In step 1236, the variable count is incremented by one and the method returns to step 1214.

Re-Pointing Using a Punctured DRC Lock

Depending on an implementation of a communication system, a performance of the re-pointing method using a DRC Lock for indication of a reverse link condition may suffer due to the delay in the feedback loop. The update rate of the feedback loop may be too slow in handling sudden changes in reverse link quality. Such performance detriment may result in outages, which may be intolerable in certain application, e.g., real-time applications.

Therefore, in another embodiment, the DRC Lock Bit is updated at a higher rate and punctured into an RPC channel one or more times every frame. The term punctured is used herein to mean sending the DRC Lock Bit instead of a RPC bit. The DRC Lock Bit is sent by all the AP's in the AT 104 active set. In one embodiment, a transmission of the DRC Lock Bit to each AT is staggered, i.e., referenced off a frame offset assigned to the AT. This allows for allocating additional power to the RPC channel during the transmission of the DRC Lock Bit in order to provide an additional margin to reduce the DRC Lock Bit errors at the AT; therefore, preventing an erroneous handoffs and possible loss in forward link throughput. The AT 104 uses the DRC Lock Bit information to select the serving AP.

Access Point Processing

Figure 13:
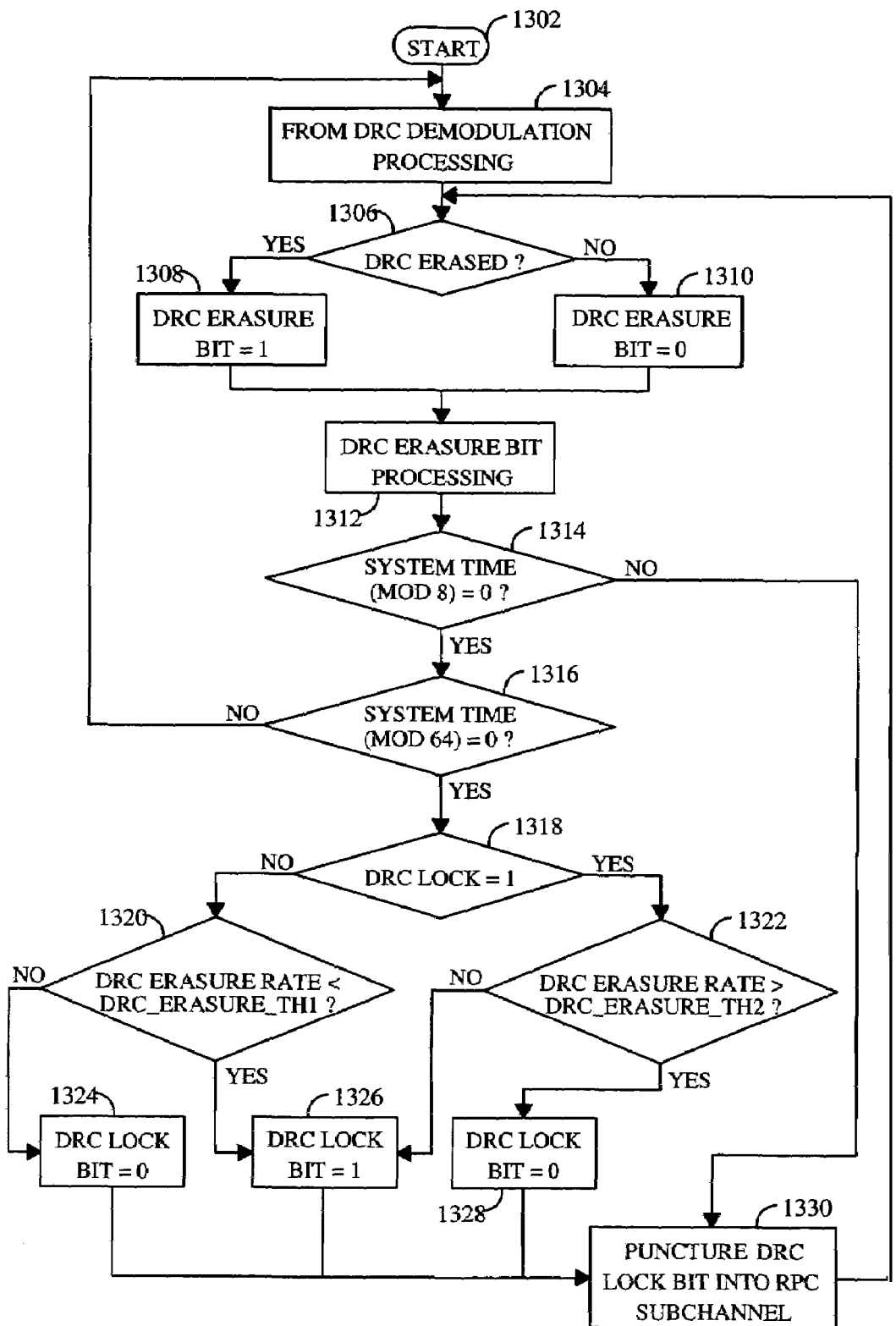
FIG. 13 illustrates the Access Point processing of the DRC for a Punctured DRC Lock Bit method.

The method in accordance with one embodiment is illustrated in FIG. 13. The method starts in step 1302. The method continues in step 1304.

In step 1304, the AP receives an updated DRC. The method continues in step 1306.

In step 1306, the AP tests the received DRC. If the DRC was erased, the method continues in step 1308; otherwise, the method continues in step 1310.

In step 1308, the DRC erasure is assigned a value of 1. The method continues in step 1312.

In step 1310, the DRC erasure is assigned a value of 0. The method continues in step 1312.

In step 1312, the DRC Erasure Bit is processed to generate a DRC erasure rate. In one embodiment, the processing comprises filtering by a filter with a pre-determined time constant. In one embodiment, the filter is realized in a digital domain. The value of the pre-determined time constant is established in accordance with system simulation, by experiment or other engineering methods known to one of ordinary skills in the art as an optimum in accordance with:

reliability of an estimate ensuing from a choice of the time constant; and latency of an estimate ensuing from a choice of the time constant.

In one embodiment, pre-determined time constant is 64 time-slots. The method continues in step 1314.

In step 1314, the system time is tested to establish whether the DRC Lock Bit is to be punctured into the RPC sub channel. In one embodiment, illustrated in step 1314, the DRC Lock Bit is punctured into the RPC sub channel each eighth (mod 8) time instance. Because the aim of selecting the time instance is to achieve a pre determined bit error rate, one of ordinary skills in the art recognizes that other time instances can be selected. The values of the time instance is selected to optimize the following requirements:

Minimize the degradation of the reverse link resulting from loss of RPC bits due to puncturing; and providing the DRC Lock Bit at optimal spacing.

If the test is positive, the method continues in step 1330; otherwise the method continues in step 1316.

In step 1316, the system time is tested to establish whether the DRC Lock Bit is to be updated. The time instance for the update is selected to ensure reliable delivery of the DRC Lock Bit. In one embodiment, illustrated in step 1316, the DRC Lock Bit is updated every sixty-fourth (mod 64) time instance. If the test is positive, the method continues in step 1318; otherwise the method returns to step 1304.

Steps 1318 through 1328 introduce hysteresis rules for generating the DRC Lock Bit. The hysteresis is introduced to avoid rapid re-pointing when the channel SINR varies rapidly. The hysteresis rules are as follows:

If the DRC Lock Bit is currently set to one, then the filtered DRC erasure rate must exceed first DRC erasure threshold (DRC-Erasure_Th2) for the DRC Lock Bit to be set to zero; and if the DRC Lock Bit is currently set to zero, then the Filtered DRC Erasure rate has to be below a second pre-determined DRC erasure threshold (DRC_Erasure_Th1) for the DRC Lock to be set to one.

In one embodiment, the values DRC_Erasure_Th1 and DRC_Erasure_Th2 are pre-determined in accordance with the communication system simulation by experiment or other engineering methods known to one of ordinary skills in the art. In another embodiment, the values DRC_Erasure_Th1 and DRC_Erasure_Th2 are changed in accordance with the change of the conditions of the communication link. In either embodiment, the values of DRC_Erasure_Th1 and DRC_Erasure_Th2 are selected to optimize the following requirements:

minimize the dead-zone (when the DRC Lock Bit is not updated); and transmit the most current reverse link channel state information to the AT.

In step 1318, the DRC Lock Bit value is compared to 1. If the DRC Lock Bit value equals 1, the method continues in step 1322; otherwise, the method continues in step 1320.

In step 1320, the DRC erasure rate is compared to the DRC_Erasure_Th1. If the DRC erasure rate is greater than the DRC_Erasure_Th1, the method continues in step 1324; otherwise, the method continues in step 1326.

In step 1322, the DRC erasure rate is compared to the DRC_Erasure_Th2. If the DRC erasure rate is less than the DRC_Erasure_Th2, the method continues in step 1326; otherwise, the method continues in step 1328.

In step 1324, the DRC Lock Bit value is set to 0. The method continues in step 1330.

In step 1326, the DRC Lock Bit value is set to 1. The method continues in step 1330.

In step 1328, the DRC Lock Bit value is set to 0. The method continues in step 1330.

In step 1330, the DRC Lock Bit is punctured into the RPC channel in accordance with the timing signal obtained in step 1314. The method returns to step 1306.

Access Terminal Processing

The AT 104 receives and demodulates the RPC channel from all APs in the AT 104 active set. Consequently, the AT 104 recovers the DRC Lock Bits punctured into the RPC channel for every AP in the AT 104 active set. Furthermore, as discussed, the punctured DRC Lock Bits are updated with a higher frequency than the Message Based DRC Lock Bits. Consequently, in a Demodulation phase, the AT 104 can combine the energy of received DRC Lock Bits during one update interval, and compare the combined DRC Lock Bits energy against a DRC Lock Bit threshold. If the combined DRC Lock Bit energy is greater than the DRC Lock Bit threshold, the AT 104 declares the DRC Lock Bit from the particular AP "in-lock." In the Decision phase, the AT 104 uses the DRC Lock Bit value to make a re-pointing decision.

Demodulation Phase

Figure 14:
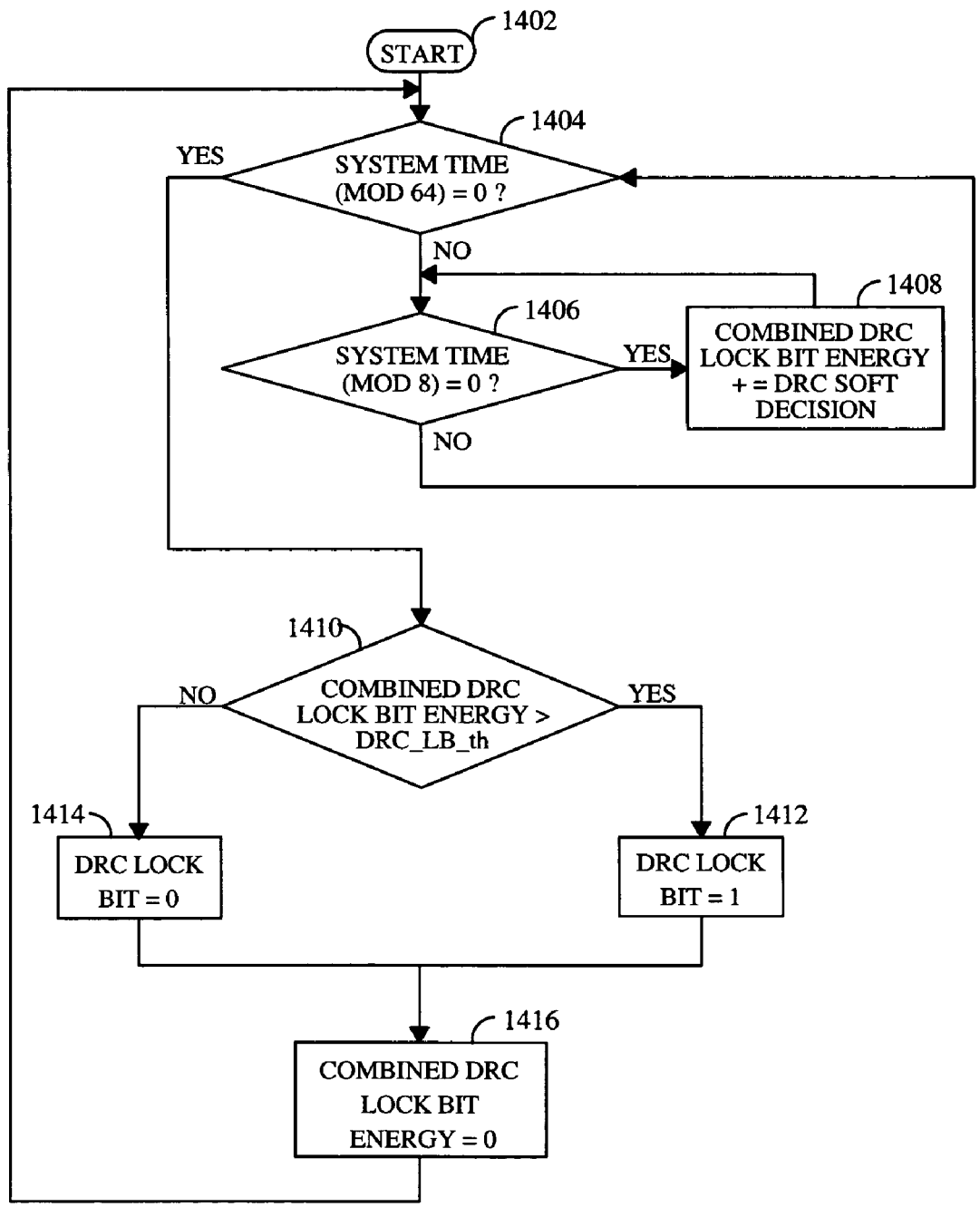
FIG. 14 illustrates a Demodulation phase for the Punctured DRC Lock Bit method.

The Demodulation phase in accordance with one embodiment is illustrated in FIG. 14. The method starts in step 1402 and continues in step 1404.

In step 1404, the system time is tested to establish whether the DRC Lock Bit was updated. In one embodiment, illustrated in step 1404, the DRC Lock Bit is updated every sixty-fourth (mod 64) time instance. This time instance corresponds to the update rate at the AP. If the test is positive, the method continues in step 1410; otherwise the method returns to step 1406.

In step 1406, the system time is tested to establish whether the DRC Lock Bit was punctured into the RPC sub channel. In one embodiment, illustrated in step 1404, the DRC Lock Bit is punctured into the RPC sub channel each eighth (mod 8) time instance. This time instance corresponds to the puncture rate at the AP. If the test is positive, the method continues in step 1408; otherwise the method returns to step 1404.

In step 1410, the combined DRC Lock Bit energy is tested against a DRC Lock Bit threshold (DRC_LB_TH). If the test is positive, the method continues in step 1412;

otherwise the method returns to step 1414.

In step 1412, the DRC Lock Bit value is set to 1. The method continues in step 1416.

In step 1414, the DRC Lock Bit value is set to 0. The method continues in step 1416.

In step 1416, the variable containing the combined DRC Lock Bit energy is set to zero for the next update.

Decision Phase

The AT uses the DRC Lock Bit value obtainer in the Demodulation phase to make a decision with respect to a re-pointing. In one embodiment, the decision phase comprises (i) Accreditation phase, (ii) Certification phase, and (iii) Decision phase. The respective phases are described below.

Accreditation Phase

In the accreditation phase, the forward link SINR of the non-serving sectors (FL_NS) is compared to the forward link SINR of the current serving sector modified by a pre-determined hysteresis margin (FL_HYST). If the forward link SINR of the non-serving sector is greater than the forward link SINR of the serving sector modified by a pre-determined hysteresis margin, then the temporary credits (TEMP_CREDIT) associated with that non-serving sector are incremented; otherwise, the temporary credits associated with that non-serving sector are decremented.

Figure 15:
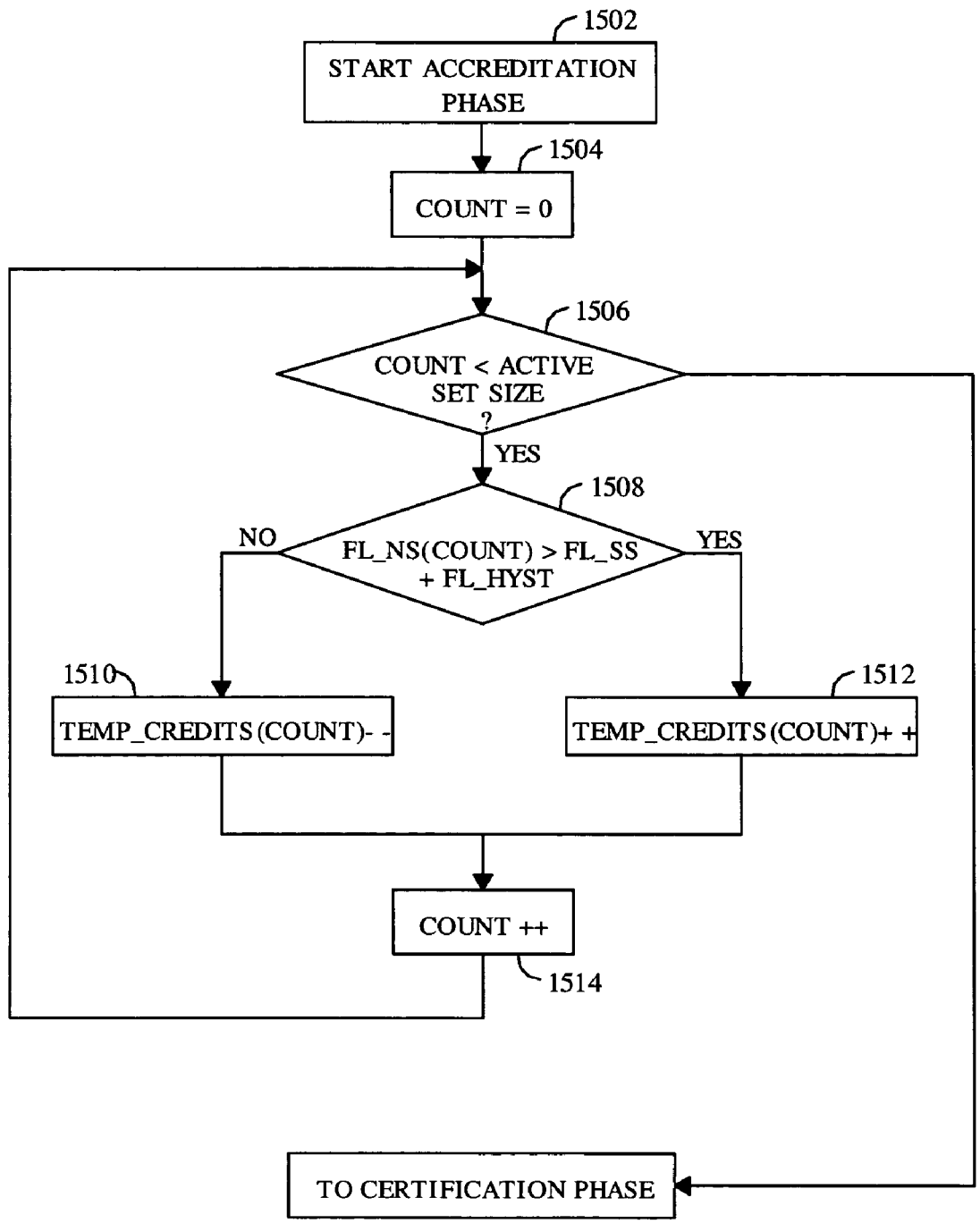
FIG. 15 illustrates an Accreditation phase for the Punctured DRC Lock Bit method.

The Accreditation phase in accordance with one embodiment is illustrated in FIG. 15. The method starts in step 1502. The method continues in step 1504.

In step 1504, a variable count is set to zero. The method continues in step 1506.

In step 1506, the variable count is tested against an active set size. If the variable count is greater than the active set size, the method continues in the Certification phase; otherwise, the method continues in step 1508.

In step 1508, an inquiry is made whether the forward link SIR of the sector designated by the variable count is greater than the forward link SINR of the current serving sector modified by a pre-determined hysteresis margin. If the test is positive, the method continues in step 1512; otherwise, the method continues in step 1510.

In step 1510, the temporary credits for the sector identified by the variable count are decreased by one. The method continues in step 1514.

In step 1512, the temporary credits for the sector identified by the variable count are increased by one. The method continues in step 1514.

In step 1514, the variable count is increased by one. The method returns to step 1506.

Certification Phase

In the certification phase, the credits of the sectors are certified. The term certification as used herein means a decision, which sectors' credits (CREDITS) will be increased by the temporary credits accumulated by the sector during the accreditation phase. In one embodiment, the certification decision is made in accordance with the following rules:

If the DRC Lock Bit of the current serving sector is "in-lock," and if the DRC Lock Bit on a non-serving sector is "in-lock," then the credits of the non-serving sector are incremented by the DRC Lock Interval. The term DRC Lock interval as used herein means a number of time-slots over which the DRC Lock Indication has been sent;

if the DRC Lock Bit of the current serving sector is "out-of-lock", and if the DRC Lock Bit on a non-serving sector is "in-lock" then the credits of the non-serving sector are incremented by the number of accumulated temporary credits;

otherwise the credits of the non-serving sector are set to zero.

Figure 16:
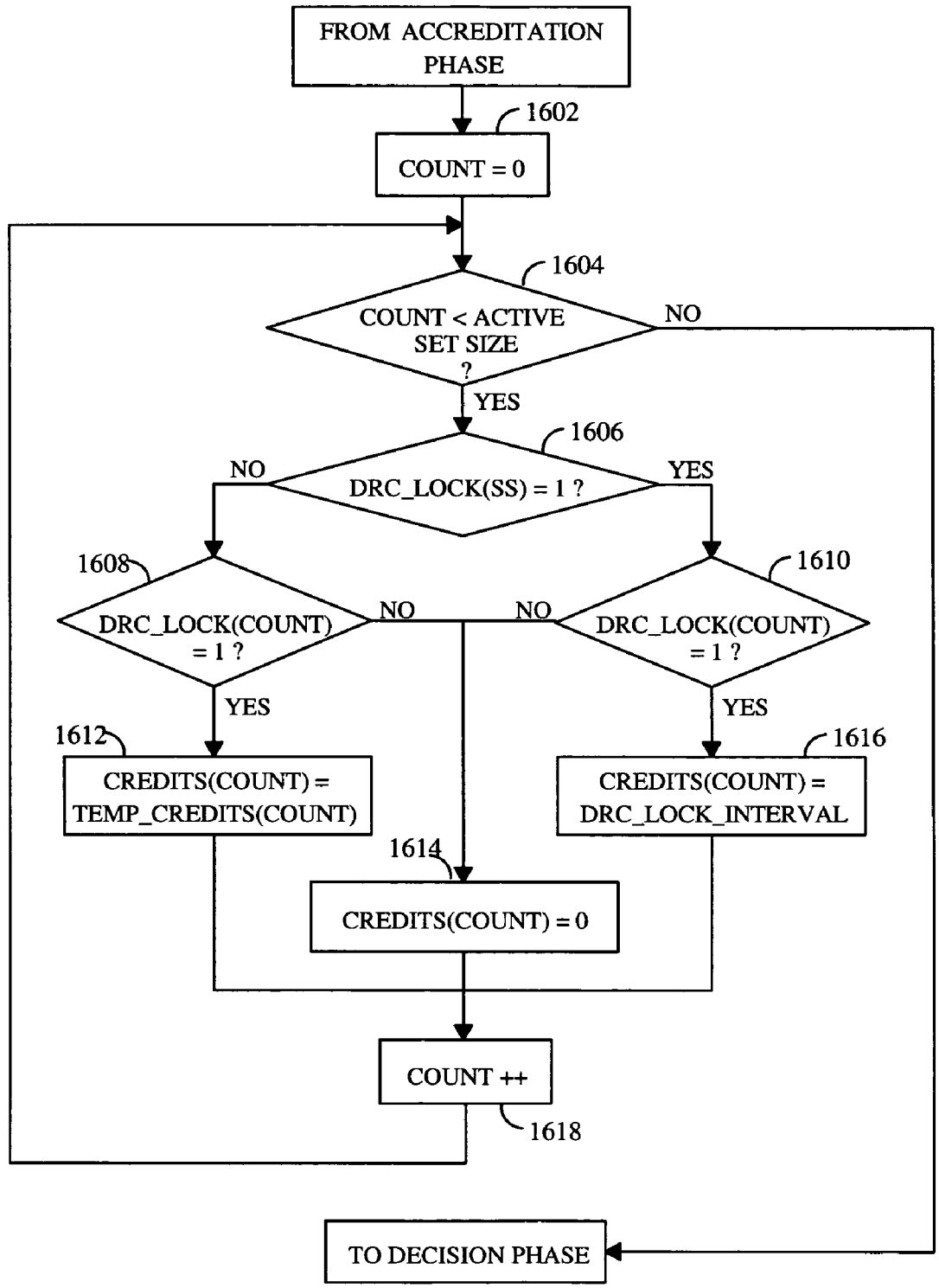
FIG. 16 illustrates a Certification phase for the Punctured DRC Lock Bit method.

The Certification phase in accordance with one embodiment is illustrated in FIG. 16. The method starts in step 1602, in which a variable count is set to zero. The method continues in step 1604.

In step 1604, the variable count is tested against an active set size. If the variable count is greater than the active set size, the method continues in the Decision phase; otherwise, the method continues in step 1606.

In step 1606, the DRC_LOCK of the serving sector is compared to 1. If the DRC_LOCK is equal to 1, the method continues in step 1610; otherwise, the method continues in step 1608.

In step 1608, the DRC_LOCK of the non-serving sector identified by the variable count is compared to 1. If the DRC_LOCK is equal to 1, the method continues in step 1612; otherwise, the method continues in step 1614.

In step 1612, the credits of the non-serving sector identified by the variable count is set to the value of temporary credits.

In step 1614, the credits of the non-serving sector identified by the variable count are set to 0.

In step 1610, the DRC_LOCK of the non-serving sector identified by the variable count is compared to 1. If the DRC_LOCK is equal to 1, the method continues in step 1616; otherwise, the method continues in step 1614.

In step 1616, the credits of the non-serving sector identified by the variable count is set to the value of DRC Lock Update Interval.

In step 1618, the variable count is increased by one. The method returns to step 1604.

Decision Phase

In the decision phase, the AT makes a re-pointing decision in accordance with the certified credits. In one embodiment, the AT determines the non-serving sectors, the certified credits of which are greater than or equal to the soft/softer handoff delay of the sector. The AT then re-points to one of the determined sectors that has the highest credits. If multiple sectors have equal credits, then the AT repoints the DRC to the sector with the best forward link.

Figure 17:
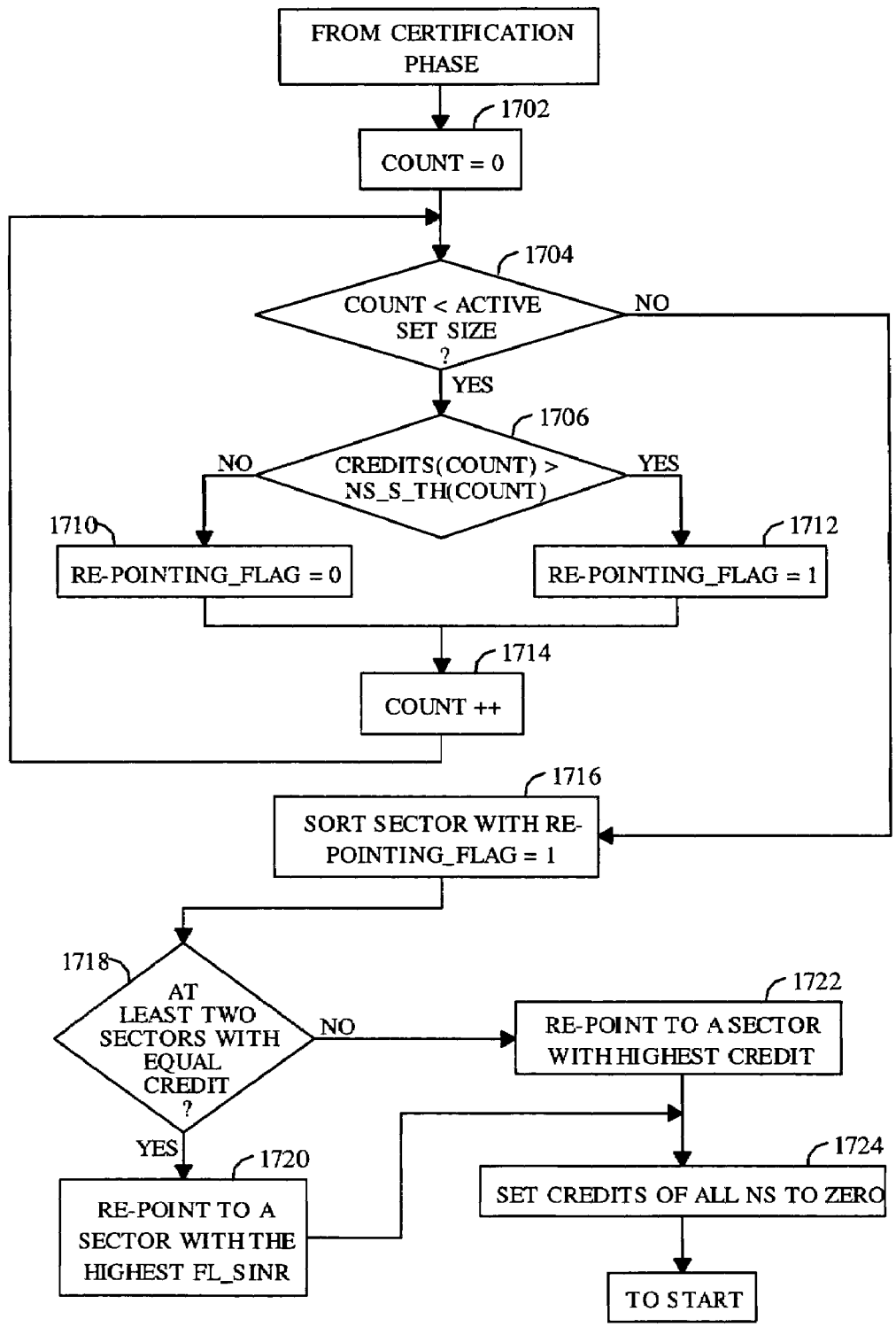
FIG. 17 illustrates a Decision phase for the Punctured DRC Lock Bit method.

The Decision phase in accordance with one embodiment is illustrated in FIG. 17.

The method starts in step 1702, in which a variable count is set to zero. The method continues in step 1704.

In step 1704, the variable count is tested against an active set size. If the variable count is greater than the active set size, the method continues in step 1716, otherwise, the method continues in step 1706.

In step 1706, the temporary credits of the sector identified by the variable count are compared to the soft (or softer) handoff delay for the non-serving sector (NS_S_Th) identified by the variable count. If the credits are less than the soft (or softer) handoff delay for the non-serving sector (NS_S_Th) identified by the variable count, the method continues in step 1710; otherwise, the method continues in step 1712.

In step 1710, the re-pointing flag is set to zero. The method continues in step 1714.

In step 1712, the re-pointing flag is set to one. The method continues in step 1714.

In step 1714, the variable count is incremented. The method returns to step 1704.

In step 1716, the sectors with a re-pointing flag set to 1 are sorted in accordance to the sectors' accumulated credits. The method continues in step 1718.

In step 1718, a test is made whether two or more sectors have equal value of the accumulated credits. If the test is positive, the method continues in step 1720; otherwise the method continues in step 1722.

In step 1720, the AT re-points to the sector with the greatest value of a forward link SINR. The method continues in step 1724.

In step 1722, the AT re-points to the sector with the greatest value of the accumulated credit. The method continues in step 1724.

In step 1724, the accumulated credits of all sectors are initialized to zero. The method returns to the Demodulation phase.

Re-pointing Using Only Forward Link

In all previously described embodiments, the re-pointing decision was made by the AT 104 in accordance with a condition of both a forward and a reverse links. As discussed, the AT 104 can also make the re-pointing decision in accordance with a condition of a forward link or a condition on a reverse link. In accordance with another embodiment, the AT 104 makes the re-pointing decision in accordance with a condition of a forward link only. Because no feedback from a sector to an AT is provided, all processing is carried out at the AT.

Access Terminal Processing

The processing method at the AT in accordance with the embodiment comprises the phases of (i) Initialization, (ii) Credit Accumulation, and (iii) Decision, as described in reference to paragraph 1.2, and associated FIGS, modified as follows.

Initialization

During the initialization stage, the AT 104 selects a sector with the best forward link quality metric, i.e., the highest SINR, as the serving sector. The AT 104 sets the DRC for the selected sector "in-lock" and initializes credits for all non-serving sectors to zero.

In one embodiment, only one type of credits—switching credits—is defined.

Consequently, in FIG. 4 and the accompanying text only the switching credits are initialized to zero in step 412.

Credit Accumulation

The switching credits are used to qualify a non-serving sector for re-pointing.

The switching credits (CS_NS) are incremented if a forward link SINR of the non-serving sector (FL_NS) is greater than a forward link SINR of the current serving sector (FL_SS) modified by a pre-determined value (FL_S-INR_Th). The CS_NS are decremented if the above condition is not satisfied.

The pre-determined value FL_SINR_Th is selected so that re-pointing to another sector results in an increase in forward link SINR and, consequently, in an increase in an average requested data rate.

In one embodiment, the minimum value for the credits is zero, and the maximum for the credits is equal to a soft handoff delay or a softer handoff delay. The delay used is determined based on whether or not the non-serving sector is in the same cell as the serving sector. If the non-serving sector is in the same cell as the serving sector then the softer handoff delay is used, and if the non-serving sector is in a cell different from the one that the serving sector is part of, then the soft handoff delay is used.

The credits, initialized to zero in the Initialization phase, are accumulated during the Credit Accumulation phase. Consequently, referring to FIG. 5, and the accompanying text, steps 510, 511, and 514 are deleted. Furthermore, step 508 is modified as follows:

In step 508, a forward link SINR of a sector designated by the variable count is compared against forward link SINR of the current serving sector modified by the FL_SINR_Th. If the forward link SINR of the sector designated by the variable count is greater than the forward link SINR of the current serving sector modified by the FL_SINR_Th, the method continues in step 516; otherwise, the method continues in step 512.

Decision

Because no feedback information about the reverse link is presented to the AT, the sector selection is carried out in accordance with the switching credits.

To carry out the decision, the AT first ascertains if any of the non-serving sectors has switching credits greater than a threshold determined by the soft/softer delay (NS_S_Th) for the non-serving sector. (Thus, threshold is the same for both the switching and monitoring credits.) If at least one of the non-serving sectors has switching credits greater than the threshold, the AT re-points its DRC to the sector with the highest switching credits. If two or more non-serving sectors have equal switching credits, the sector with the highest current quality forward link is selected.

If none of the non-serving sectors has sufficient switching credits to mandate re-pointing, the AT continues pointing its DRC to the current serving Access Point.

The decision phase in accordance with one embodiment is illustrated in reference to FIGS. 7 and 8 and the accompanying text. In reference with FIG. 7, steps 714 through 722 are deleted. Steps 710 and 712 are modified as follows:

In step 710, a value of the variable Cand_S identified by the variable count is set to 0. The method continues in step 724.

In step 712, a value of the variable Cand_S identified by the variable count is set to 1. The method continues in step 724.

Referring to FIG. 8, the sector selection from FIG. 7 continues. In reference with FIG. 8, steps 822 through 838, and 842 through 846 are deleted. Steps 814, 818, and 820 are modified as follows:

In step 814, the value of the variable CS_NS_count is ascertained. If the value of the variable CS_NS_count is equal to 1, the method continues in step 816. If the value of the variable CS_NS_count is greater that 1, the method continues in step 818. Otherwise, the method continues in step 840.

In step 818, the AT re-points the DRC to the candidate sector identified by the variable count that has the highest quality forward link. The method continues in step 820.

In step 820, the variable CS_NS is set to zero. The method returns to the credit accumulation phase.

Those of ordinary skill in the art will recognize that although the various embodiments were described in terms of flowcharts and methods, such was done for pedagogical purposes only. The methods can be performed by an apparatus, which in one embodiment comprises a processor interfaced with a transmitter and a receiver or other appropriate blocks at the AT and/or AP.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. An apparatus for directing communication between a remote station and a plurality of sectors in a data communication system, the remote station including a list of eligible sectors, the apparatus comprising:
    means for determining at the remote station a quality metric of a forward link for each sector in the remote station's list;
    means for determining a quality metric of a reverse link to each sector in the remote station's list, said means for determining the quality metric of the reverse link to each sector in the remote station's list comprising means for processing at the remote station the forward link from each sector in the remote station's list, said means for processing at the remote station the forward link from each sector in the remote station's list comprising:
    means for ascertaining a first signal value at a position in a first channel of the forward link for at least one sector in the remote station's list;
    means for determining the quality metric in accordance with said ascertained first signal value for the at least one sector in the remote station's list;
    means for ascertaining a second signal value at a position in a second channel of the forward link for remaining sectors in the remote station's list; and
    means for determining a second quality metric in accordance with said ascertained second signal value for the remaining sectors in the remote station's list; and
    means for directing communication between the remote station and one sector from the sectors in the remote station's list in accordance with said determined quality metric of a forward link and said determined quality metric of a reverse link, said means for directing communication between the remote station and one sector from the sectors in the remote station's list comprising:
    means for assigning credits to each sector in the remote station's list except the sector currently serving the remote station in accordance with said determined quality metric of a forward link, said determined quality metric of the reverse link, and said determined second quality metric of the reverse link;
    means for directing communication between the remote station and one sector from the sectors in the remote station's list in accordance with said assigned credits;
    means for decreasing credits of a sector if said determined second quality metric of the reverse link for the sector and said determined second quality metric of the reverse link for a sector currently serving the remote station are greater than a second threshold; and
    means for decreasing a first type of credits of a sector if said determined quality metric of the reverse link for the sector is insufficient, or if said quality metric of a forward link of the sector is less than the quality metric of the forward link of the sector currently serving the remote station, and said first quality metric of the reverse link for a sector was not determined.

2. The apparatus of claim 1, wherein said means for decreasing a first type of credits comprises means for decreasing switching credits of the sector.

3. The apparatus claim 1, further comprising:
    means for increasing the first type of credits of a sector if:
        the sector's quality metric of a forward link is greater than the quality metric of the forward link of the sector currently serving the remote station; and
        the sector's determined second quality metric of the reverse link is less than the second threshold; or if:
        the sector's quality metric of a forward link is greater than the quality metric of the forward link of the sector currently serving the remote station; and
        the sector's determined quality metric of the reverse link is sufficient; and
    means for increasing a second type of credits of a sector if:
        the sector's quality metric of a forward link is greater than the quality metric of the forward link of the sector currently serving the remote station;
        said determined second quality metric of the reverse link of the sector's quality metric of a reverse link is greater than the second threshold; and
        said determined second quality metric of the reverse link of the sector currently serving the remote station is less than the second threshold.

4. The apparatus of claim 1, wherein said means for increasing a second type of credits comprises means for increasing monitoring credits of the sector.

* * * * *